United States Patent
Gallagher

(10) Patent No.: US 10,750,805 B2
(45) Date of Patent: Aug. 25, 2020

(54) ADHESIVE FABRICATION PROCESS FOR GARMENTS AND OTHER FABRIC PRODUCTS

(71) Applicant: Cohesive Systems LLC, Mechanicsville, PA (US)

(72) Inventor: Joseph E. Gallagher, Mechanicsville, PA (US)

(73) Assignee: Cohesive Systems LLC, Mechanicsville, PA (US)

(*) Notice: Subject to any disclaimer, the term of this patent is extended or adjusted under 35 U.S.C. 154(b) by 84 days.

(21) Appl. No.: 15/869,942

(22) Filed: Jan. 12, 2018

(65) Prior Publication Data

US 2018/0263319 A1 Sep. 20, 2018

Related U.S. Application Data

(63) Continuation of application No. 15/402,330, filed on Jan. 10, 2017, now Pat. No. 9,867,411, which is a (Continued)

(51) Int. Cl.
  *A41D 27/02* (2006.01)
  *B32B 7/03* (2019.01)
  (Continued)

(52) U.S. Cl.
  CPC ............ *A41D 27/02* (2013.01); *A41B 11/005* (2013.01); *A41B 11/01* (2013.01); *A41D 1/06* (2013.01);
  (Continued)

(58) Field of Classification Search
  CPC .......... A41D 27/02; A41D 1/06; A41D 19/01; A41D 19/001; A41D 27/245; A41D 31/02;
  (Continued)

(56) References Cited

U.S. PATENT DOCUMENTS 4,715,805 A 12/1987 Nasu
5,050,241 A * 9/1991 Flowers .................. B32B 27/12
                                                          2/457
(Continued)

FOREIGN PATENT DOCUMENTS

DE       19917369 A1   10/2000
WO    2012/078826 A2   6/2012

OTHER PUBLICATIONS

Hydraulic Press (Heated), Drytac Brochure, (2015), retrieved online from http://www.drytac.com/hotpress-dry-mounting-presses/hydraulic-press-heated.html on Jul. 2, 2015.

*Primary Examiner* — Michael N Orlando
*Assistant Examiner* — Abhishek A Patwardhan
(74) *Attorney, Agent, or Firm* — Verrill Dana, LLP

(57) ABSTRACT

A process for fabricating a three-dimensional, multi-layered fabric product with a moisture barrier is provided. A partially seamed inner lining fabric assembly having at least a two-dimensional shape is laminated with a membrane barrier film having flaps left un-laminated to cover at least one seam. The inner lining fabric assembly is further seamed and flaps of the of the membrane barrier film overlapped into contact with each other and sealed to provide a continuous moisture barrier. A process for fabricating a stretchable section of a garment with a moisture barrier is also provided. At least a section of a garment is formed from fibers arranged in a pattern having a direction of stretch in one direction and a three-dimensional surface texture such that a portion of the fibers protrude above another portion of the fibers. The stretchable section is stretched in the direction of stretch. Segments of a membrane barrier film are adhered to an outer edge of the protruding portion of the fibers while the section is stretched in the direction of stretch, leaving intermediate segments of the barrier film free from adherence to the section. In this way, the intermediate segments of (Continued)

the membrane barrier film include slack that folds up to form ruches when the section is in a relaxed state.

19 Claims, 15 Drawing Sheets

Related U.S. Application Data continuation of application No. PCT/US2015/039980, filed on Jul. 10, 2015, which is a continuation-in-part of application No. PCT/US2014/046142, filed on Jul. 10, 2014.

(60) Provisional application No. 62/166,000, filed on May 24, 2015, provisional application No. 62/022,829, filed on Jul. 10, 2014.

(51) Int. Cl.

| | |
|---|---|
| *B32B 5/02* | (2006.01) |
| *B32B 5/18* | (2006.01) |
| *B32B 27/06* | (2006.01) |
| *B32B 27/12* | (2006.01) |
| *B32B 27/32* | (2006.01) |
| *B32B 27/36* | (2006.01) |
| *B32B 27/40* | (2006.01) |
| *A41D 19/00* | (2006.01) |
| *A41D 31/02* | (2019.01) |
| *A41D 27/24* | (2006.01) |
| *B32B 5/24* | (2006.01) |
| *B32B 27/18* | (2006.01) |
| *B32B 5/26* | (2006.01) |
| *B32B 5/08* | (2006.01) |
| *B32B 7/14* | (2006.01) |
| *B32B 5/22* | (2006.01) |
| *A41B 11/01* | (2006.01) |
| *A41H 43/04* | (2006.01) |
| *A41D 31/102* | (2019.01) |
| *A41B 11/00* | (2006.01) |
| *A41D 1/06* | (2006.01) |
| *A41D 19/01* | (2006.01) |
| *A43B 23/07* | (2006.01) |
| *B29C 65/02* | (2006.01) |
| *B29C 65/08* | (2006.01) |
| *B29C 65/48* | (2006.01) |
| *B29C 65/62* | (2006.01) |
| *B29C 65/00* | (2006.01) |
| *B32B 7/02* | (2019.01) |
| *B32B 7/08* | (2019.01) |
| *B32B 7/12* | (2006.01) |
| *B32B 37/06* | (2006.01) |
| *B32B 37/10* | (2006.01) |
| *B32B 37/12* | (2006.01) |
| *B32B 37/14* | (2006.01) |
| *B32B 37/18* | (2006.01) |
| *B32B 38/18* | (2006.01) |
| *B29L 31/48* | (2006.01) |
| *B29L 31/50* | (2006.01) |
| *B32B 38/00* | (2006.01) |

(52) U.S. Cl.
CPC ........... *A41D 19/001* (2013.01); *A41D 19/01* (2013.01); *A41D 27/245* (2013.01); *A41D 31/02* (2013.01); *A41D 31/102* (2019.02); *A41H 43/04* (2013.01); *A43B 23/07* (2013.01); *B29C 65/02* (2013.01); *B29C 65/08* (2013.01); *B29C 65/48* (2013.01); *B29C 65/62* (2013.01); *B29C 66/20* (2013.01); *B29C 66/45* (2013.01); *B29C 66/729* (2013.01); *B29C 66/7294* (2013.01); *B29C 66/7485* (2013.01); *B32B 5/022* (2013.01); *B32B 5/024* (2013.01); *B32B 5/026* (2013.01); *B32B 5/08* (2013.01); *B32B 5/18* (2013.01); *B32B 5/22* (2013.01); *B32B 5/245* (2013.01); *B32B 5/26* (2013.01); *B32B 7/02* (2013.01); *B32B 7/03* (2019.01); *B32B 7/08* (2013.01); *B32B 7/12* (2013.01); *B32B 7/14* (2013.01); *B32B 27/065* (2013.01); *B32B 27/12* (2013.01); *B32B 27/18* (2013.01); *B32B 27/32* (2013.01); *B32B 27/322* (2013.01); *B32B 27/36* (2013.01); *B32B 27/40* (2013.01); *B32B 37/06* (2013.01); *B32B 37/10* (2013.01); *B32B 37/1018* (2013.01); *B32B 37/12* (2013.01); *B32B 37/144* (2013.01); *B32B 37/182* (2013.01); *B32B 38/1808* (2013.01); *B29L 2031/48* (2013.01); *B29L 2031/50* (2013.01); *B32B 2038/008* (2013.01); *B32B 2262/02* (2013.01); *B32B 2262/0238* (2013.01); *B32B 2262/0246* (2013.01); *B32B 2262/0253* (2013.01); *B32B 2262/0261* (2013.01); *B32B 2262/0276* (2013.01); *B32B 2262/0292* (2013.01); *B32B 2262/06* (2013.01); *B32B 2262/062* (2013.01); *B32B 2262/08* (2013.01); *B32B 2262/14* (2013.01); *B32B 2264/108* (2013.01); *B32B 2266/025* (2013.01); *B32B 2305/022* (2013.01); *B32B 2305/182* (2013.01); *B32B 2305/188* (2013.01); *B32B 2305/28* (2013.01); *B32B 2307/724* (2013.01); *B32B 2307/7265* (2013.01); *B32B 2317/10* (2013.01); *B32B 2323/10* (2013.01); *B32B 2327/06* (2013.01); *B32B 2327/18* (2013.01); *B32B 2333/00* (2013.01); *B32B 2367/00* (2013.01); *B32B 2369/00* (2013.01); *B32B 2375/00* (2013.01); *B32B 2377/00* (2013.01); *B32B 2437/00* (2013.01); *B32B 2437/02* (2013.01)

(58) Field of Classification Search
CPC .............. A41D 31/102; A41D 2300/52; A41D 2300/20; B32B 7/03; B32B 7/12; B32B 37/06; B32B 37/10; B32B 37/1018; B32B 37/12; B32B 37/182; B32B 38/1808; B32B 5/022; B32B 5/024; B32B 5/026; B32B 5/18; B32B 27/065; B32B 27/12; B32B 27/32; B32B 27/36; B32B 27/40; B32B 2038/008; B32B 2266/025; B32B 2305/022; B32B 2305/182; B32B 2305/188; B32B 2305/28; B32B 2317/10; B32B 2323/10; B32B 2327/06; B32B 2327/18; B32B 2333/00; B32B 2369/00; B32B 2375/00; B32B 2377/00; B32B 2437/02; B32B 2262/02; B32B 2262/0238; B32B 2262/0246; B32B 2262/0261; B32B 2262/0276; B32B 2262/0292; B32B 2262/062; B32B 2262/08; B32B 2437/00; B32B 2262/0253; B32B 2262/06; B32B 2262/14; B32B 2264/108; B32B 2307/724; B32B 2307/7265; B32B 5/08; B32B 5/22; B32B 5/245; B32B 5/26; B32B 27/18; B32B 7/02; B32B 7/08; B32B 27/322; B32B 2367/00; B32B 7/14; A41B 11/005; A41B 11/01; A43B 23/07; B29C 65/02; B29C 65/08; B29C 65/48;

B29C 65/62; B29C 66/20; B29C 66/45; B29C 66/729; B29C 66/7294; B29C 66/7485; B29L 2031/48; B29L 2031/50; A41H 43/04

USPC .......... 156/73.4, 290, 304.6, 308.4, 93, 157, 156/304.1, 304.2, 304.3, 304.4; 428/58, 428/57, 61

See application file for complete search history.

(56) References Cited

U.S. PATENT DOCUMENTS

| | | | |
|---|---|---|---|
| 6,497,934 | B1 | 12/2002 | Mahn, Jr. et al. |
| 8,003,185 | B2 | 8/2011 | Liggett |
| 2003/0126673 | A1 | 7/2003 | Yardley |
| 2004/0025221 | A1 | 2/2004 | Clark |
| 2004/0266297 | A1 | 12/2004 | Schierenbeck et al. |
| 2005/0102863 | A1* | 5/2005 | Hannon ............... A41D 15/005 36/57 |
| 2007/0204482 | A1 | 9/2007 | Gibson-Collinson |
| 2008/0044614 | A1 | 2/2008 | Hannon |
| 2008/0166514 | A1 | 7/2008 | Liggett |
| 2012/0282425 | A1* | 11/2012 | Gallagher ............ A41D 27/245 428/61 |
| 2013/0008051 | A1 | 1/2013 | Meyer et al. |

* cited by examiner

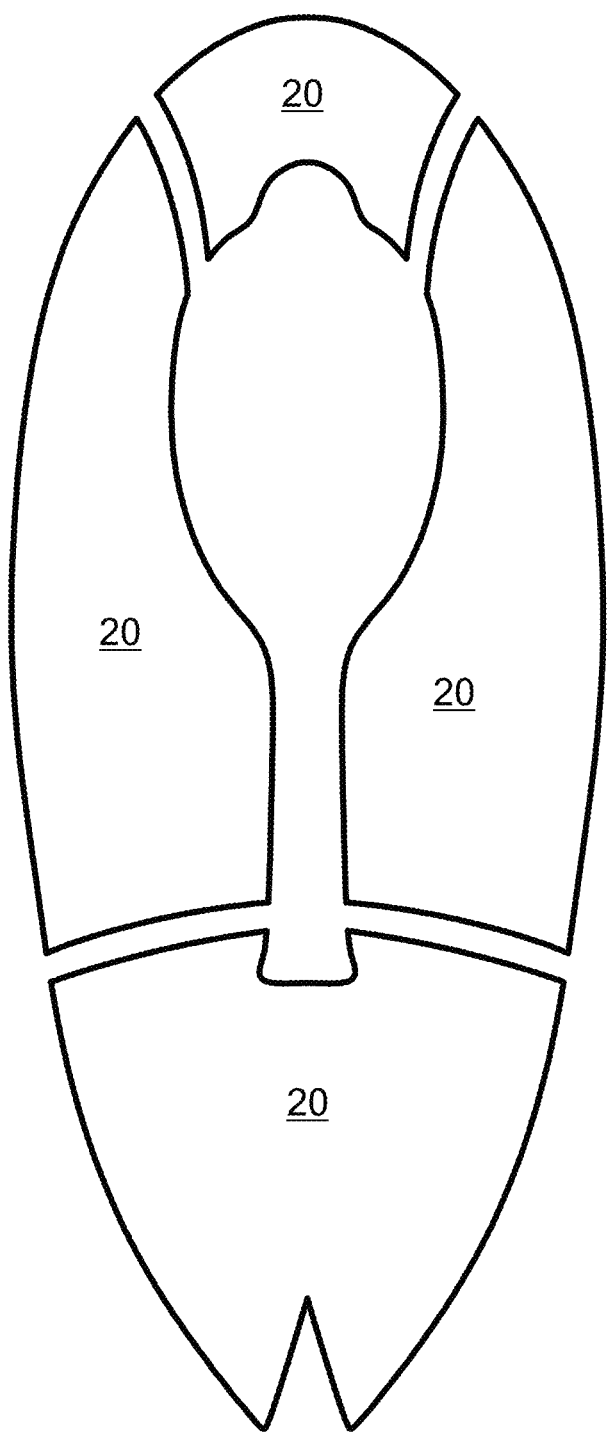 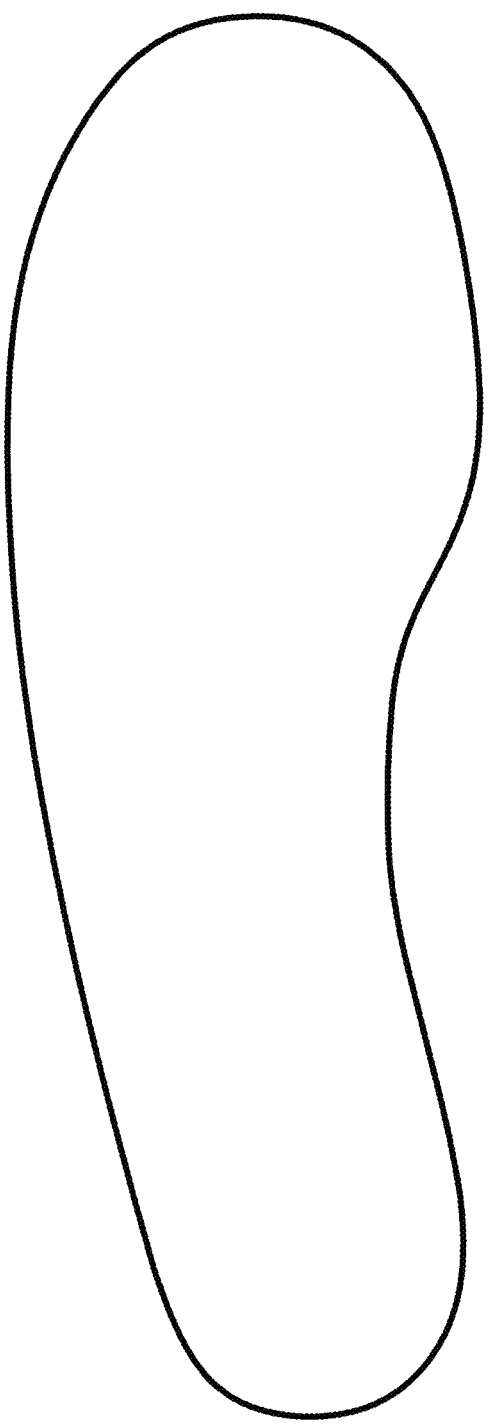
*FIG. 4A*  *FIG. 4B*

Section A-A

Section B-B

Direction of stretch

ADHESIVE FABRICATION PROCESS FOR GARMENTS AND OTHER FABRIC PRODUCTS

CROSS REFERENCE TO RELATED APPLICATIONS

This application is a continuation of and claims priority under 35 U.S.C. § 120 of U.S. application Ser. No. 15/402,330, filed Jan. 10, 2017, which is a continuation of PCT International Application No. PCT/US2015/039980, filed on Jul. 10, 2015, entitled "Adhesive Fabrication Process for Garments and Other Fabric Products"; which claims priority under 35 U.S.C. § 119(e) of U.S. Provisional Application No. 62/022,829, filed on Jul. 10, 2014, entitled "Ruche Fabrication Process to Provide a Moisture Barrier in Stretchable Garments and Other Fabric Products" and U.S. Provisional Application No. 62/166,000, filed on May 24, 2015, entitled "Waterproof Bootie Liner and Method of Manufacture"; and which is a continuation-in-part of and claims priority under 35 U.S.C. § 120 of PCT International Application No. PCT/US2014/046142, filed on Jul. 10, 2014, entitled "Fabrication Process for Garments and Other Fabric Products"; the disclosures of all of which are hereby incorporated by reference.

STATEMENT REGARDING FEDERALLY SPONSORED RESEARCH OR DEVELOPMENT

N/A

BACKGROUND

The availability of waterproof or water resistant fabrics for outerwear presents challenges to create seams that share the water shedding characteristics of the fabrics. Waterproof or water resistant garments are constructed using laminated waterproof fabrics, in which an outer face fabric of water repellant material and a hydrostatic barrier material inside the outer face fabric have been bonded together prior to fabrication of the garment.

The use of such laminated fabrics containing a hydrostatic barrier material poses the problem of how to join the barrier material across a seam without introducing leak pathways. Additionally, the seams provide a weak point in the garment, such that, even if the hydrostatic barrier material is capable of withstanding tens or hundreds of washings without degradation, the seams generally do not withstand more than five or so washings. Thus, the seams are a prime location for the garment to begin to degrade.

Providing waterproof or water resistant inserts for garments or articles such as shoes or boots and gloves or mittens has also been difficult due to the complex three-dimensional shapes of such articles.

It has also been difficult to add such membrane barrier films to garments that incorporate stretchable sections, such as knit socks, gloves, or sweaters, because the membrane barrier films are not made of a sufficiently stretchable or elastic material to match the stretch of the stretchable garment.

SUMMARY OF THE INVENTION

The invention relates to a process for fabricating a three-dimensional multi-layered fabric product. One aspect of the process is the fabrication of a three-dimensional multi-layered liner insert to impart water resistant properties to a garment. Exemplary three-dimensional liner inserts include, without limitation, inserts for boots, shoes, gloves, or any other type of garment that could include a three-dimensional liner insert. The invention also relates to a fabrication process that provides a moisture barrier to garments that incorporate a stretchable section.

The process overcomes disadvantage of previous designs, which employ seaming of a number of panels by sewing, which compromises the integrity of the membrane barrier film at the seams, or which utilize seam tape, creating bulky seams and complex assembly procedures. Instead of sewing a composite containing a membrane, the process uses overlapping membrane flaps which are joined at the seams without the need for stitching or other adhesives to yield a continuous membrane surface area across the seams. The flaps of the membrane barrier film material are capable of forming a strong bond with the application of heat and/or pressure at the seams. The hydrostatic pressure resistance value of the membrane barrier film is equal to the hydrostatic value of the uniform laminated membrane film surface area and is essentially constant throughout the fabric product. The barrier qualities of the membrane barrier film are equal to the barrier qualities of the uniform laminated membrane film surface area. The process provides an in-line lamination production method that creates a stitchless laminated membrane barrier film and inner lining fabric composite structure in the form of a three-dimensional liner insert. The process also allows for the usage of multiple fabric panels to create custom insert panel products.

Optional features include: (i) a membrane film protective fabric adhesive composite, which is positioned on top of the membrane barrier film; (ii) an abrasive patch, formed by die cutting and positioning a protective fabric adhesive composite within, e.g., one or more high stress areas; (iii) insulation, which is cut, positioned and pressed within the required insulation surface area; (iv) a multi-layer composite can be added by adding another layer of protective fabric or foam; (v) an insulation patch can be a gel type insulation or any other thermal insulation; (vi) a flat heat press with a variable height platen can be used to increase or decrease the adhesion surface of the adhesive composite to a specific area; (vii) a flat heat press with a variable height platen or a micro-dot platen can increase the adhesion surface area and allow a higher MVTR through a TPU polyurethane membrane film or a co-polyester membrane barrier film, as the thermoplastic membrane barrier film melts into the fabric surfaces which creates a lower mil barrier surface area. The membrane barrier film can comprise or consist of materials such as polyurethane (PU), polyethylene (PE), thermoplastic polyurethane (TPU), or expanded polytetrafluoroethylene (ePTFE). The membrane barrier film provides a liner insert with resistance to penetration of liquid water. If TPU is used as the membrane barrier film, the TPU film can serve as both the membrane and the adhesive. Alternatively, a non-TPU membrane barrier film or the liner insert composite can use an adhesive, such as a micro dot, nano dot, powder, film, or web adhesive, to create the surface bond. The membrane barrier film can be coated with a PU to enhance adhesion. The membrane barrier film can be a single-film-to-fabric TPU polyurethane or co-polyester. The membrane barrier film can be breathable type, which allows the passage of water vapor but not water droplets or bulk liquid water, or a non-breathable type that does not allow the passage of water vapor. The membrane barrier film can be slit to create ventilation outlets one sides of the liner insert, or where open ventilation is required and a water barrier is not required. The membrane barrier film can be integrated into the entire liner insert or can be positioned in selective areas of the liner insert, creating a selective panel membrane film area.

In one embodiment, the membrane barrier film lamination process creates a uniform laminated layer within a liner insert assembly. Lamination is performed "in line" during the bootie liner assembly process, rather than relying on pre-made composite materials. The membrane barrier film first is die-cut into a single, seamless piece. The membrane barrier film is not compromised, because the edges of the membrane barrier film flaps are overlapped when seamed to create the three-dimensional form of the liner insert, and are sealed to another portion of the membrane barrier film, creating a hydrostatic bond. If a membrane barrier film protective fabric is desired, an adhesive composite can be use, having adhesive on the inner surface of the membrane barrier film protective cover fabric. The adhesive and optional membrane barrier film protective fabric composite also are cut to a single, seamless piece. The adhesive, membrane barrier film protective fabric composite can be present throughout the liner insert, or can be positioned in selective areas of the liner insert, creating a selective panel membrane film protective fabric surface area.

The adhesive can be a solid film adhesive, microdot adhesive, nano-dot adhesive, powder adhesive or a web adhesive. Examples of suitable adhesive materials are PE and PU having a suitable melting temperature below that of the other components of the bootie liner (i.e., the membrane, inner lining fabric, and optional membrane protective fabric. If a microdot adhesive is used, the surface area or the microdot placement can be adjusted, depending on the required fiber surface tension. The use of overlapping membrane flaps eliminates the requirement of traditional seam tape or additional adhesives.

Other aspects of the process include the following:

1. A process for fabricating a waterproof or water-resistant, three-dimensional, multi-layered fabric product comprising:
   (a) seaming a plurality of panels of an inner lining fabric or fabric composite structure along at least one seam to form an inner lining fabric assembly having a two-dimensional shape or a three-dimensional shape;
   (b) overlaying the inner lining fabric assembly with a membrane barrier film covering the at least one seam and including at least one flap extending beyond at least one edge of the shape of the inner lining fabric assembly or extending beyond a left-open seam of the inner lining fabric assembly;
   (c) laminating the membrane barrier film to the inner lining fabric assembly to form a laminated structure, leaving un-laminated at least an area adjacent to the edge of the shape of the inner lining fabric assembly or adjacent to the left-open seam;
   (d) seaming the inner lining fabric assembly of the laminated structure along the area adjacent to the edge left un-laminated or along the left-open seam to form a closed seam having a three-dimensional configuration;
   (e) overlapping the flap of the membrane barrier film into contact with a further surface of the membrane barrier film along at least the edge left un-laminated or the closed seam; and
   (f) sealing the overlapping flap and further surface of the membrane barrier film.

2. The process of item 1, wherein step (a) further comprises seaming the plurality of panels of the inner lining fabric along the at least one seam to form a three-dimensional shape.

3. The process of any of items 1-2, wherein step (c) further comprises applying heat, pressure, or both heat and pressure to laminate the membrane barrier film to the inner lining fabric assembly.

4. The process of any of items 1-3, wherein step (c) further comprises placing the three-dimensional shape on a three-dimensional vacuum forming lamination table and applying heat, vacuum, or heat and vacuum to the three-dimensional shape and the membrane barrier film.

5. The process of any of items 1-4, wherein step (d) further comprises sewing or ultrasonically welding the inner lining fabric assembly along the area adjacent to the edge left un-laminated or along the left-open seam.

6. The process of any of items 1-5, wherein the left-open seam comprises a bootie liner insert toe box seam, a bootie liner insert vamp area seam, a bootie liner insert side seam, a bootie liner insert bottom seam, or a bootie liner insert gusset seam.

7. The process of any of items 1-6, wherein in step (a), the plurality of panels includes a heel piece, a gusset, a shoe bottom, or a gasket.

8. The process of any of items 1-7, wherein the membrane barrier film comprises a hydrophobic polymer membrane.

9. The process of any of items 1-8, wherein the membrane barrier film comprises a material that is self-adhesive under heat or pressure or both heat and pressure.

10. The process of any of items 1-9, wherein the membrane barrier film comprises a thermoplastic polyurethane.

11. The process of any of items 1-7 and 9-10, wherein the membrane barrier film includes an adhesive on at least one side.

12. The process of any of items 1-7 and 9-11, wherein the adhesive comprises a microdot adhesive, a film adhesive, a powder adhesive, or a web adhesive.

13. The process of any of items 1-12, wherein the membrane barrier film comprises a polyethylene material, a polyurethane material, a cross-linked polyurethane material, a polypropylene material, a polyester material, an expanded polytetrafluoroethylene material, a polytetrafluoroethylene material, a microporous polytetrafluoroethylene material, or a nanoporous polytetrafluoroethylene material.

14. The process of any of items 1-13, further comprising applying a protective layer or a protective patch over the membrane barrier film to form the laminated structure.

15. The process of any of items 1-14, wherein the protective layer or the protective patch comprises a tricot material.

16. The process of any of items 1-15, wherein the protective patch is applied over a high stress area.

17. The process of any of items 1-16, further comprising applying an insulation panel between the inner lining fabric and the membrane barrier film.

18. The process of any of items 1-17, wherein the insulation panel comprises an aerogel insulation, a fleece material, or a synthetic fiber material.

19. The process of any of items 1-18, wherein the inner lining fabric comprises synthetic fibers, natural fibers, or a blend of synthetic fibers and natural fibers.

20. The process of any of items 1-19, wherein the synthetic fibers comprise polyesters, polyamides, polyvinyl chlorides, polyketones, polysulfones, polycarbonates, fluoropolymers, polyacrylates, polyurethanes, co-polyetheresters, polypropylenes, or co-polyetheramides, or blends thereof.

21. The process of any of items 1-20, wherein the natural fibers comprise cotton, wool or silk.

22. The process of any of items 1-21, wherein the inner lining fabric comprises a woven fabric, a nonwoven fabric, a knit fabric, a felt, or a foam.

23. The process of any of items 1-22, wherein the fabric composite structure comprises layers of fabric laminated or glued together.

24. A liner insert for a garment made by the process of any of items 1-23.

25. The liner insert of item 24, wherein the liner insert is configured as an insert for a boot, a shoe, a glove, a mitten, a sock, or pants.

26. The liner insert of any of items 24 and 25, wherein the liner insert comprises a bootie liner insert.

27. A process for fabricating a stretchable section of a garment, comprising:

forming at least a section of a garment from a fabric comprising fibers arranged in a pattern having a direction of stretch in one direction and a three-dimensional surface texture such that a portion of the fibers protrude above another portion of the fibers;

stretching the section in the direction of stretch;

adhering segments of a membrane barrier film to an outer edge of the protruding portion of the fibers while the section is stretched in the direction of stretch, leaving intermediate segments of the barrier film free from adherence to the section, whereby the intermediate segments of the membrane barrier film include slack that folds up to form ruches when the section is in a relaxed state.

28. The process of item 27, wherein the membrane barrier film comprises a hydrophobic polymer membrane.

29. The process of any of items 27-28, wherein the membrane barrier film is comprised of a polyethylene material, a polyurethane material, a cross-linked polyurethane material, a polypropylene material, a polyester material, an expanded polytetrafluoroethylene material, a polytetrafluoroethylene material, a microporous polytetrafluoroethylene material, or a nanoporous polytetrafluoroethylene material.

30. The process of any of items 27-29, wherein the membrane barrier film includes activated carbon particles with microporous structures.

31. The process of any of items 27-30, wherein the membrane film comprises a breathable material.

32. The process of any of items 27-31, wherein in the forming step, the section of the garment is knit with a rib knit pattern, and the direction of stretch is generally transverse to a longitudinal direction of ribs of the rib knit pattern.

33. The process of any of items 27-32, wherein the section of the garment is formed from polyester, nylon, or lycra fibers.

34. The process of any of items 27-33, wherein the section of the garment is formed form at least two different fibers, the fibers having differing adherence characteristics to an adhesive on the membrane barrier film.

35. The process of any of items 27-34, wherein the membrane barrier film includes an adhesive, the adhesive comprising a film adhesive, a micro dot adhesive, a nano dot adhesive, a powder adhesive or a web adhesive.

36. The process of any of items 27-35, wherein the membrane barrier film includes an adhesive, the adhesive comprising a polyethylene or a polyurethane.

37. The process of any of items 27-36, wherein the membrane barrier film includes an adhesive disposed at discrete locations on the membrane barrier film.

38. The process of any of items 27-37, wherein the discrete locations align with the protruding portion of the fibers while the section is stretched in the direction of stretch.

39. The process of any of items 27-38, wherein in the stretching step, the section is stretched over a two-dimensional platen.

40. The process of any of items 27-39, further comprising applying at least one of heat, pressure, and vacuum to the platen to set an adhesive between the membrane barrier film and the protruding portion of the fibers of the section.

41. The process of any of items 27-40, further comprising inserting elements to space the intermediate segments of the membrane barrier film from the section to prevent adherence of the intermediate segments while adhering the segments of the membrane barrier film to the section.

42. The process of any of items 27-41, wherein the stretchable section comprises a sock, a bootie, a bootie liner insert, a mitten, a glove, a glove liner insert, a cuff, a waistband, a sweater, or a jacket.

43. A fabric product made by the process of any of items 27-42.

44. A process for fabricating a multi-layered fabric product comprising:

(a) providing fabric pattern panels of at least an outer shell fabric, a barrier layer and an adhesive interposed between the outer shell fabric and the barrier layer, the outer shell fabric and the barrier layer provided as separate fabric pattern panels, the barrier layer comprising one of a moisture barrier and an insulation barrier;

(b) aligning each barrier layer fabric pattern panel to a corresponding one or more outer shell fabric pattern panels to form a plurality of composite fabric pattern panels;

(c) fusing each of the composite fabric pattern panels together, leaving an area about a perimeter of each composite fabric pattern panel unfused;

(d) forming at least one seam between outer shell fabric pattern panels of adjacent composite fabric pattern panels along the area left unfused;

(e) folding one or more of the unfused areas of the barrier layer and the adhesive back so that the one or more unfused areas of the barrier layer and the adhesive overlap;

(f) fusing a plurality of the composite fabric pattern panels of the fabric product together to form a continuous barrier extending across an inner surface of the outer shell fabric and the at least one seam between the outer shell fabric pattern panels.

45. The process of item 44, wherein the barrier layer comprises a membrane barrier film.

46. The process of any of items 44-45, wherein the membrane barrier film comprises a hydrophobic polymer membrane.

47. The process of any of items 44-46, further comprising fusing all of the composite fabric pattern panels of the fabric product together to form a continuous barrier extending across an inner surface of the outer shell fabric and the at least one seam between the outer shell fabric pattern panels.

48. The process of any of items 44-47, wherein the membrane barrier film comprises a micro porous structure that allows transport of water vapor across the membrane barrier film while preventing or minimizing transport of liquid water across the membrane barrier film.

49. The process of any of items 44-48, wherein the membrane barrier film includes activated carbon particles with microporous structures.

50. The process of any of items 44-49, wherein the membrane barrier film comprises a microporous polytetrafluoroethylene, a nanoporous polytetrafluoroethylene, an expanded PTFE, a polyurethane, a cross-linked polyurethane, a polypropylene, or a polyester.

51. The process of any of items 44-50, wherein the barrier layer is capable of withstanding a hydrostatic pressure of at least 45 psi including across the at least one seam.

52. The process of any of items 44-50, wherein the continuous barrier is equally resistant to hydrostatic pressure across the inner surface of the outer shell fabric and the at least one seam.

53. The process of any of items 44-52, wherein the continuous barrier is equally resistant to at least one of pathogenic microorganisms, blood borne pathogens, viruses, bacteria, liquid chemical agents, and gaseous chemical agents across the inner surface of the outer shell fabric and the at least one seam.

54. The process of any of items 44-53, wherein the continuous barrier is equally resistant to heat loss across the inner surface of the outer shell fabric and the at least one seam.

55. The process of any of items 44-54, wherein the barrier layer comprises an insulation material.

56. The process of any of items 44-55, wherein the insulation material comprises a natural or synthetic filament material.

57. The process of any of items 44-56, wherein step (c) further includes fusing an inner lining fabric pattern panel with a corresponding one of the plurality of composite fabric pattern panels and step (e) includes folding the inner lining fabric pattern panel back over the seam so that unfused areas overlap.

58. The process of any of items 44-57, wherein the inner lining fabric comprises a fleece material or a tricot material.

59. The process of any of items 44-58, wherein the inner lining fabric comprises multiple layers quilted together.

60. The process of any of items 44-59, wherein the inner lining fabric comprises a polyester, a polyamide, a polyvinylchloride, a polyketone, a polysulfone, a polycarbonate, a fluoropolymer, a polyacrylate, a polyurethanes, a co-polyetherester, a polypropylene, and a co-polyetheramide.

61. The process of any of items 44-60, wherein the adhesive comprises a powder adhesive, a web adhesive, a micro dot adhesive, a nano dot adhesive.

62. The process of any of items 44-61, wherein the outer shell fabric comprises a polyester, a polyamide, a polyvinylchloride, a polyketone, a polysulfone, a polycarbonate, a fluoropolymer, a polyacrylate, a polyurethanes, a co-polyetherester, a polypropylene, and a co-polyetheramide.

63. The process of any of items 44-62, wherein the outer shell fabric comprises multiple layers quilted together.

64. The process of any of items 44-63, wherein step (d) comprises sewing or ultrasonically welding the outer shell fabric pattern panels together along the area left unfused.

65. The process of any of items 44-64, wherein step (f) includes fusing the composite fabric pattern panels together on a three-dimensional pressing machine.

66. The process of any of items 44-65, wherein step (f) includes fusing the composite fabric pattern panels together on a two-dimensional pressing machine.

67. The process of any of items 44-66, wherein in step (c), fusing each of the composite fabric pattern panels together with a soft set that allows the layers to be adjusted.

68. The process of any of items 44-67, wherein in step (c), fusing each of the composite fabric pattern panels together with a hard set that does not allow the layers to be adjusted.

69. The process of any of items 44-68, wherein in step (e), folding the one or more of the unfused areas of the barrier layer and the adhesive back over the at least one seam.

70. A fabric product made by the process of any of items 44-69.

71. The fabric product of item 70, wherein the fabric product comprises an article of clothing, a portion of an article of clothing, a liner insert, a bootie liner insert, a glove liner insert, a jacket, a coat, a parka, a raincoat, a cloak, a poncho, a shirt, a blouse, pants, shoes, boots, gloves, a hat, a hood, underwear, an undershirt, briefs, a bra, socks, a diaper, a protective suit for handling of hazardous materials, a protective suit for a firefighter, military personnel, or medical personnel, a blanket, a towel, a sheet, pet bedding, a tent, a sleeping bag, a tarp, a boat cover, carpeting, a rug, a mat, a window covering, and upholstery.

72. A process for fabricating a multi-layered fabric product comprising:

(a) providing fabric pattern panels of at least an outer shell fabric, a barrier layer and an adhesive interposed between the outer shell fabric and the barrier layer, the outer shell fabric and the barrier layer provided as separate fabric pattern panels, the barrier layer comprising one of a moisture barrier and an insulation barrier, the fabric pattern panel of the barrier layer having a configuration corresponding to at least two fabric pattern panels of the outer shell fabric seamed together;

(b) seaming the at least two outer shell fabric pattern panels together along a seam to from a flat outer shell assembly;

(c) aligning the barrier layer fabric pattern panel to the flat outer shell assembly to extend across the seam to form a composite fabric pattern panel;

(d) fusing the composite fabric pattern panel together, leaving an area about a perimeter of the composite fabric pattern panel unfused;

(e) seaming the outer shell assembly to a further outer shell piece;

(f) fusing the fabric product to form a complete fabric product having a continuous barrier extending across an inner surface of the outer shell fabric and at least one seam between the outer shell fabric pattern panels.

73. A process for fabricating a multi-layered fabric process incorporating a moisture barrier layer, comprising:

(a) providing a membrane barrier film comprising a first membrane film having a first melting temperature laminated to a second membrane film having a second melting temperature lower than the first melting temperature, each of the first membrane film and the second membrane film comprising a micro porous structure that allows transport of water vapor across the film while preventing or minimizing transport of liquid water across the film;

(b) providing fabric pattern panels of at least an outer shell fabric, the membrane barrier film, and in inner lining fabric, the outer shell fabric and the barrier layer provided as separate fabric pattern panels, the barrier layer comprising one of a moisture barrier and an insulation barrier;

(c) aligning each membrane barrier film fabric pattern panel to a correspond one or more outer shell fabric pattern panels to form a plurality of composite fabric pattern panels;

(d) fusing each of the composite fabric pattern panels together at a temperature greater than the second melting temperature and less than the first melting temperature, leaving an area about a perimeter of each composite fabric pattern panel unfused;

(e) seaming the outer shell fabric pattern panels together along the area left unfused;

(f) folding the membrane barrier film and the inner lining fabric back over the seam so that the unfused areas of the membrane barrier film and the inner lining fabric overlap;

(g) fusing all of the composite fabric pattern panels together to form a complete fabric product having a continuous seamless barrier extending across an inner surface of the outer shell fabric and at least one seam between the outer shell fabric pattern panels.

74. A multi-layered fabric product comprising:

an outer shell fabric comprising a plurality of fabric pattern panels, at least one seam formed along edges of fabric pattern panels to join the fabric pattern panels together, the outer shell fabric having an inner side and an outer side;

a barrier layer comprising a plurality of fabric pattern panels fused to the inner side of the outer shell fabric, the fabric pattern panels overlapping in an area extending along the seam of the outer shell fabric, wherein a continuous barrier extends across the inner surface of the outer shell fabric and the at least one seam between the outer shell fabric pattern panels.

75. The product of item 74, wherein the at least one seam comprises a sewn seam or an ultrasonically welded seam.

76. The product of any of items 74-75, wherein the barrier layer comprises a membrane barrier film.

77. The product of any of items 74-76, wherein the membrane barrier film comprises a hydrophobic polymer membrane.

78. The product of any of items 74-77, wherein the membrane barrier film comprises a micro porous structure that allows transport of water vapor across the membrane barrier film while preventing or minimizing transport of liquid water across the membrane barrier film.

79. The product of any of items 74-78, wherein the membrane barrier film includes activated carbon particles with microporous structures.

80. The product of any of items 74-79, wherein the membrane barrier film comprises a microporous polytetrafluoroethylene, a nanoporous polytetrafluoroethylene, an expanded PTFE, a polyurethane, a cross-linked polyurethane, a polypropylene, or a polyester.

81. The product of any of items 74-80 wherein the barrier layer is capable of withstanding a hydrostatic pressure of at least 45 psi including across the at least one seam.

82. The product of any of items 74-81 wherein the barrier layer is capable of withstanding a hydrostatic pressure of at least 1 psi including across the at least one seam.

83. The product of any of items 74-84, wherein the continuous barrier is equally resistant to hydrostatic pressure across the inner surface of the outer shell fabric and the at least one seam.

84. The product of any of items 74-83, wherein the continuous barrier is equally resistant to at least one of pathogenic microorganisms, blood borne pathogens, viruses, bacteria, liquid chemical agents, and gaseous chemical agents across the inner surface of the outer shell fabric and the at least one seam.

85. The product of any of items 74-84, wherein the continuous barrier is equally resistant to heat loss across the inner surface of the outer shell fabric and the at least one seam.

86. The product of any of items 74-85, wherein the barrier layer comprises an insulation material.

87. The product of any of items 74-86, wherein the insulation material comprises a natural or synthetic filament material.

88. The product of any of items 74-87, further comprising an inner lining fabric pattern panel fused to the barrier layer and overlapping in the area extending along the seam of the outer shell fabric.

89. The product of any of items 74-88, wherein the inner lining fabric comprises a fleece material or a tricot material.

90. The product of any of items 74-89, wherein the inner lining fabric comprises multiple layers quilted together.

91. The product of any of items 74-90, wherein the inner lining fabric comprises a polyester, a polyamide, a polyvinylchloride, a polyketone, a polysulfone, a polycarbonate, a fluoropolymer, a polyacrylate, a polyurethanes, a co-polyetherester, a polypropylene, and a co-polyetheramide.

92. The product of any of items 74-91, wherein the adhesive comprises a powder adhesive, a web adhesive, a micro dot adhesive, a nano dot adhesive.

93. The product of any of items 74-92, wherein the outer shell fabric comprises a polyester, a polyamide, a polyvinylchloride, a polyketone, a polysulfone, a polycarbonate, a fluoropolymer, a polyacrylate, a polyurethanes, a co-polyetherester, a polypropylene, and a co-polyetheramide.

94. The product of any of items 74-93, wherein the outer shell fabric comprises multiple layers quilted together.

95. The product of any of items 74-94, wherein the product comprises an article of clothing, a portion of an article of clothing, a liner inert, a bootie liner inert, a glove liner insert, a jacket, a coat, a parka, a raincoat, a cloak, a poncho, a shirt, a blouse, pants, shoes, boots, gloves, a hat, a hood, underwear, an undershirt, briefs, a bra, socks, a diaper, a protective suit for handling of hazardous materials, a protective suit for a firefighter, military personnel, or medical personnel, a blanket, a towel, a sheet, pet bedding, a tent, a sleeping bag, a tarp, a boat cover, carpeting, a rug, a mat, a window covering, and upholstery.

96. A composite material comprising:

a first layer comprising a high melt membrane film formed from a polyester material, a polyether material, a polypropylene material, a polyurethane material, a thermoplastic polyurethane material, an expanded polytetrafluoroethylene material, or a polytetrafluoroethylene material;

a second layer disposed on a first side of the first layer and comprised of a low melt membrane film formed from a polyester material, a polyether material, a polypropylene material or a polyurethane material;

the low melt membrane film having a melting temperature lower than a melting temperature of the high melt membrane film.

97. The composite material of item 96, further comprising a third layer disposed on a second side of the first layer and comprising a lower melt film formed from a polyester material, a polyether material, a polypropylene material or a polyurethane material; the lower melt membrane film having a melting temperature lower than the melting temperature of the low melt membrane film.

98. The process of any of items 1-26, further comprising:

forming at least a section of the inner lining fabric or fabric composite structure from a fabric comprising fibers arranged in a pattern having a direction of stretch in one direction and a three-dimensional surface texture such that a portion of the fibers protrude above another portion of the fibers;

stretching the section in the direction of stretch;

adhering segments of the membrane barrier film to an outer edge of the protruding portion of the fibers while the section is stretched in the direction of stretch, leaving intermediate segments of the membrane barrier film free from adherence to the section, whereby the intermediate segments of the membrane barrier film include slack that folds up to form ruches when the section is in a relaxed state.

DESCRIPTION OF THE DRAWINGS

The invention will be more fully understood from the following detailed description taken in conjunction with the accompanying drawings in which:

FIG. 4A is a plan view of pattern pieces for the bootie liner insert of FIG. 1;

FIG. 4B is a plan view of a full bottom for the bootie liner insert of FIG. 1;

DETAILED DESCRIPTION OF THE INVENTION

Figure 1:
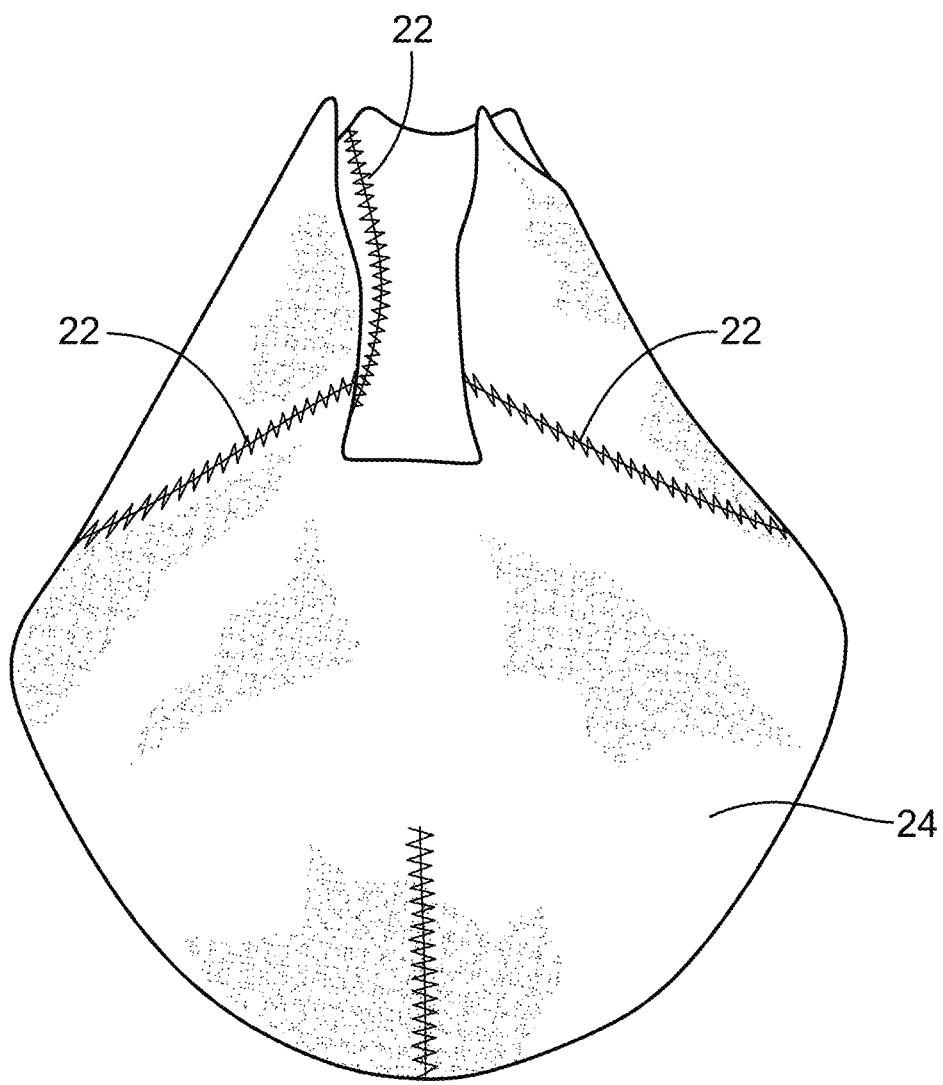
FIG. 1 is a perspective view of a bootie liner insert according to the present invention.
Figure 2:
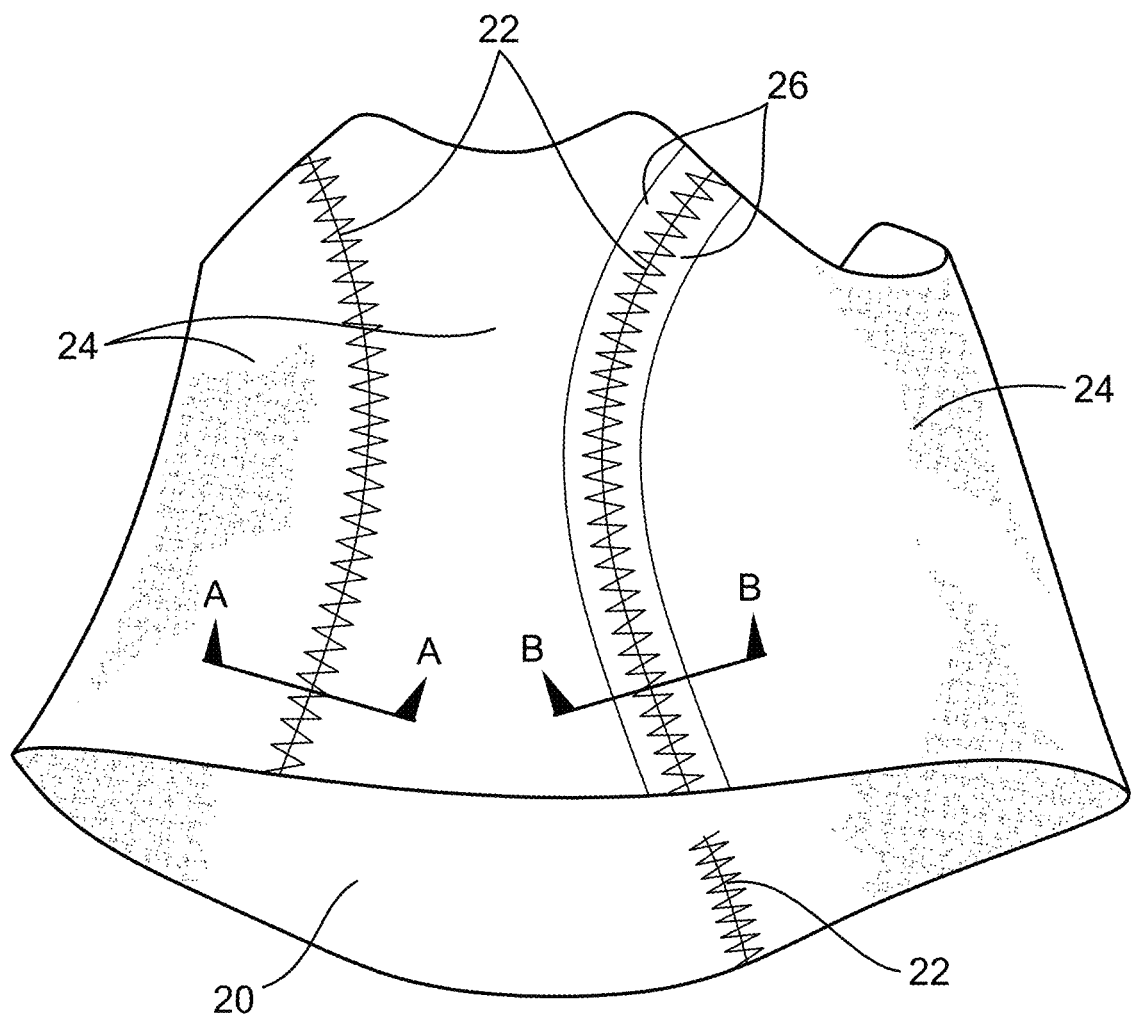
FIG. 2 is a rear view of the bootie liner insert of FIG. 1.
Figure 3:
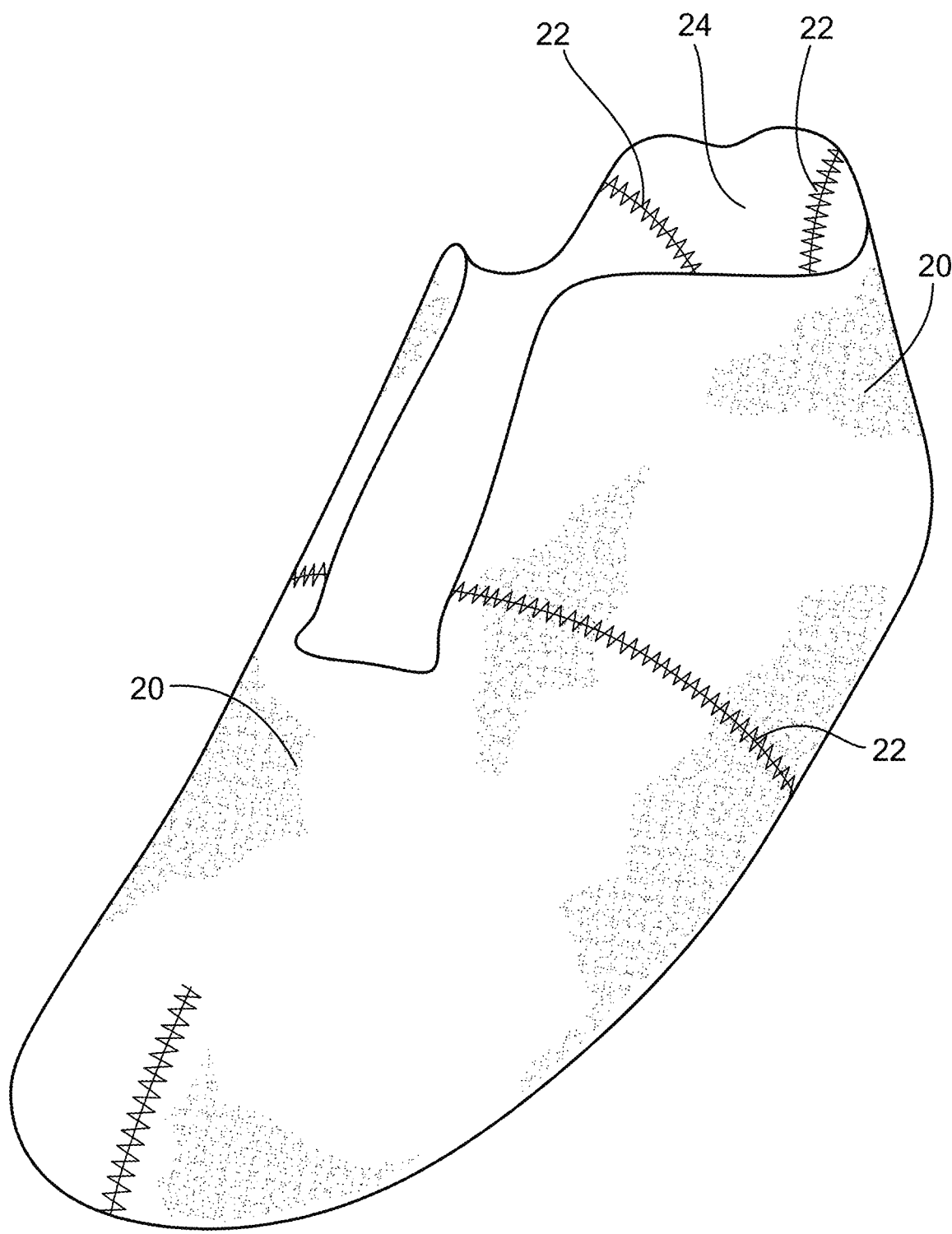
FIG. 3 is a perspective view of a reverse side of the bootie liner insert of FIG. 1.
Figure 5:
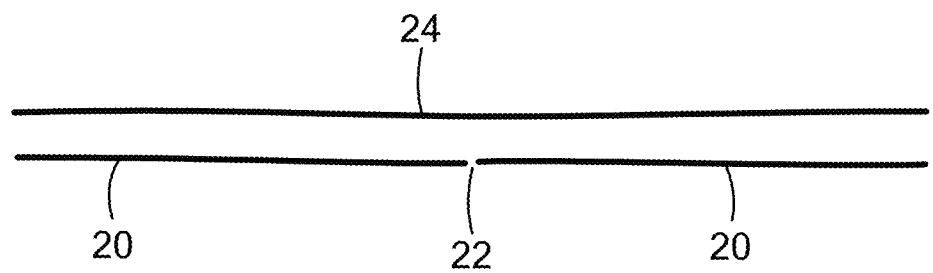
FIG. 5 is a schematic cross-sectional view taken along line A-A of FIG. 2.
Figure 6:
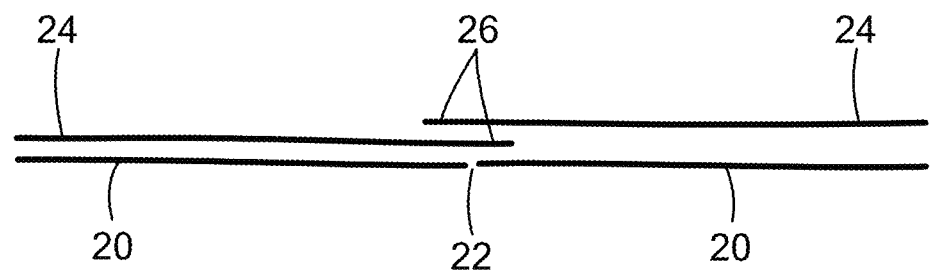
FIG. 6 is a schematic cross-sectional view taken along line B-B of FIG. 2.
Figure 7:
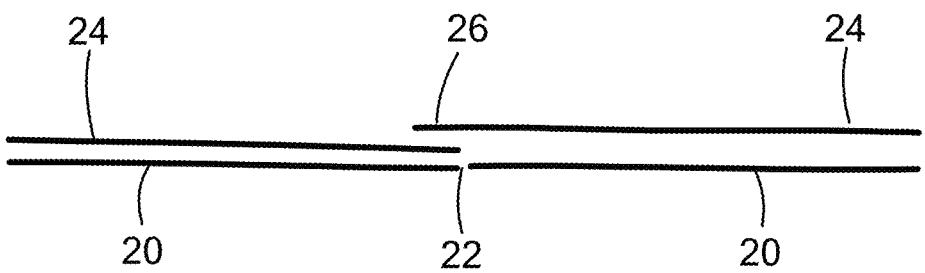
FIG. 7 is a schematic cross-sectional view of a further embodiment of a seam.

This application incorporates by reference the entire disclosures of U.S. Provisional Application No. 62/022,829, filed on Jul. 10, 2014, entitled "Ruche Fabrication Process to Provide a Moisture Barrier in Stretchable Garments and Other Fabric Products"; U.S. Provisional Application No. 62/166,000, filed on May 24, 2015, entitled "Waterproof Bootie Liner and Method of Manufacture"; PCT International Application No. PCT/US2014/046142, filed on Jul. 10, 2014, entitled "Fabrication Process for Garments and Other Fabric Products"; and PCT International Application No. PCT/US2015/039980, filed on Jul. 10, 2015, entitled "Adhesive Fabrication Process for Garments and Other Fabric Products".

In one embodiment, a liner insert fabrication process provides an in-line lamination production method that creates a stitchless laminated membrane barrier film on top of an inner lining fabric or composite fabric structure to create a three-dimensional liner insert. The membrane barrier film imparts water resistance to a garment that includes the liner insert. The process eliminates gaps or weak points along seams through which moisture could otherwise leak. The process can be used to fabricate liner inserts for items such as boots, shoes, gloves, mittens, socks, pants, or any other type of garment that could include a three-dimensional liner insert.

The liner insert is formed from an inner lining fabric or fabric composite structure and a membrane barrier film. Optionally, a protective layer or protective patch, such as a tricot layer or patch, can be included to cover and provide additional protection to the membrane barrier film. Optionally, an insulation layer or patch can be included to provide thermal insulation to the liner insert.

The membrane barrier film is made of a film material that is capable of adhering to itself when overlapped and subjected to heat and/or pressure. A thermoplastic polyurethane (TPU) is an example of a membrane barrier film that is self-adhesive under heat and/or pressure. An adhesive (such as a microdot, film, powder, or web adhesive) can be included on one or both sides of a membrane barrier film to enhance adhesion if needed. The membrane barrier film can be coated with a polyurethane to enhance adhesion. The membrane barrier films described in the processes herein can include a "hydrophobic polymer membrane" or "hydrostatic barrier membrane," which typically refers to a layer of synthetic or natural polymers that resists the passage of liquid water, in the form of droplets or microdroplets, across the membrane. The hydrophobic polymer membrane can allow the passage of water vapor, in the form of individual water molecules, so as to promote breathability of the laminated fabric. A hydrophobic polymer membrane can be prepared from a material such as, without limitation, microporous or nanoporous polytetrafluoroethylene (PTFE), expanded PTFE (ePTFE), polyethylene, polyurethane, thermoplastic polyurethane (TPU) cross-linked polyurethane, polypropylene, or polyester. One example of a waterproof laminated fabric is Gore-Tex® fabric (see, e.g., U.S. Pat. No. 3,953,566), which utilizes a porous PTFE membrane as the hydrophobic polymer membrane. The PTFE membrane of a Gore-Tex® fabric has a microstructure characterized by nodes interconnected by fibrils. The microporous or nanoporous nature of the PTFE membrane is such that water droplets are excluded from the pores, whereas water molecules can pass through the pores. Another example of a membrane barrier film is the fabrics available from Cocona Technology, which incorporate activated carbon particles with microporous structures into the films. The membrane barrier film can also include a coating, for example, to provide protection from abrasion.

The inner lining fabric or fabric composite structure can be made of any suitable synthetic or natural fabric or fabrics or blends of such fabrics. Natural fabrics can include, for example, cotton, wool, or silk or blends thereof. Synthetic fabrics can include, for example, polyesters, polyamides, polyvinyl chlorides, polyketones, polysulfones, polycarbonates, fluoropolymers, polyacrylates, polyurethanes, co-polyetheresters, polypropylenes, and co-polyetheramides. Fabric composite structures can include, for example, layers of fabrics laminated or glued together, such as a woven layer and a foam layer attached with a suitable adhesive. The fabric or any of the fabric layers in a fabric composite structure can be any suitable form, such as, without limitation, a woven, a nonwoven, a knit, a felt, or a foam.

Referring to FIGS. 1-7, one embodiment of a liner insert process is described in conjunction with fabrication of a liner insert for a shoe or boot, also called a bootie liner insert. The bootie liner insert is subsequently inserted into a boot or shoe to provide water resistance to the boot or shoe.

A bootie inner lining fabric or fabric composite structure is cut, for example, using a die cutting machine, according to a pattern for fabricating a bootie liner insert. (For simplicity, the term "inner lining fabric" when used herein also refers to a fabric composite structure.) The pattern includes multiple pattern pieces or panels 20 that can be sewn or welded together along seams to fabricate the liner insert. FIG. 4 illustrates pattern panels for an embodiment of a bootie liner insert.

The panels of the inner lining fabric are seamed together along one or more seams 22 to form an inner lining fabric assembly having a two dimensional shape or a three-dimensional shape. A two-dimensional shape allows the inner lining fabric assembly to be pressed flat. A three-dimensional shape is pressed over a three-dimensional form or mold. When seaming the inner lining fabric assembly at this step, one or more seams are left open, that is, they are not seamed together, such as by sewing or welding, at this step. This seam or these seams will be closed or seamed in a subsequent step. The seams, whether formed at this step or any other step, can be any suitable type of seam, such as a seam with a seam allowance or a butt type seam with no seam allowance. If the seam is sewn, any suitable type of stitching can be used, such as a straight stitch or a zigzag stitch. Seams can be closed or seamed using any suitable technique, such as sewing (stitching) or ultrasonic welding.

The membrane barrier film 24 is cut according to a pattern that allows at least one piece of membrane barrier film to be overlaid as a single piece on the two-dimensional or three-dimensional inner lining fabric assembly, covering the seams 22 that have already been sewn or welded. The membrane barrier film pattern also provides for flaps 26 or extensions of the membrane barrier film when it is subsequently overlaid on the inner lining fabric assembly.

The membrane barrier film is overlaid onto the inner lining fabric assembly such that each flap comes into overlying contact with another flap or another edge area of the membrane barrier film. By applying heat and/or pressure, the contacting surfaces of the membrane barrier film can be adhered to each other, thereby forming a continuous moisture barrier, eliminating leakage through the seams and other stitching perforations in the inner lining fabric assembly. For example, the cut-out membrane barrier film can be oversized to allow the membrane barrier film flaps to become available for the seams that have been left open. As another example, one of the sides of the single piece of membrane barrier film can be cut to align with a first edge of the inner lining fabric assembly, and another side of the membrane barrier film can be cut to extend beyond a second edge of the inner lining fabric assembly, to create a single membrane barrier film flap that can overlay a seam that is subsequently formed by joining the first and second edges of the inner lining fabric assembly. Membrane barrier film flaps can be provided for a bottom fabric gasket material and adhesive membrane film seal gasket (described further below). The membrane barrier film flaps can be any suitable width, such as, without limitation, $3/8$ inch, $1/2$ inch, or $5/8$ inch.

The aligned layers of the inner lining fabric assembly and the membrane barrier film are thermally fused with a hard set into a two-dimensional fabric pattern panel assembly. A strip of a suitable width, for example, $3/8$ inch, $1/2$ inch, $5/8$ inch, is left un-pressed or is soft set along the seams that have been left open (the seams of the inner lining fabric assembly that were not sewn or welded). This also creates the membrane barrier film flaps and allows them to be peeled or folded back. These flaps will be hard set by thermally fusing them at a later step.

A soft set allows the membrane barrier layer to be peeled back without damaging the surface structures. A hard set permanently sets the layers in place. As an example, when fusing fabric layers with a soft set fuse, the press can be set to a temperature of approximately 225° F. at zero pressure to allow the adhesive to flow to create an initial bond between the surfaces. This initial bond allows the individual layers to be pulled away from the other layers. When fusing fabric layers with a hard set fuse, the press can be set to a temperature between 235° F. to 275° F. at 40 psi to 50 psi for 5 to 20 seconds. After pressing, the composite fabric is cooled, under ambient or vacuum conditions, to set the adhesives into place and permanently laminate the fabric panels together.

In some embodiments, the thermal fusing can be accomplished by using a flat press for a single hit application. In other embodiments, an in-line fusing belt press for multiple hit applications or a vacuum press can be used.

In a next step, the membrane barrier film flaps are peeled or folded back. The seams of the inner lining fabric assembly that were previously left open are seamed (sewn or welded) to create a three-dimensional structure for the liner insert. The membrane barrier film flaps are subsequently unfolded to come into overlapping contact with other surface of the membrane barrier film. The flaps also overlay the newly formed seams in the inner lining fabric. If a butt-type seam is used in the inner lining fabric assembly that does not produce a seam allowance, then an oversized membrane film pattern can be used to provide the membrane film flaps. Similarly, if one of the membrane barrier film sides is cut to the distal edge of the fabric panel, the other side can be cut with an extension to allow for the membrane barrier film flap to create one film flap that is overlaid over the other edge area.

The overlaid membrane film flaps are thermally fused with a hard set to form a seamless lamination over the sewn or welded inner lining fabric seams, creating a hydrostatic seam structure. The thermal pressing can be accomplished by using a flat or curved press for a single hit application, a fusing belt press for multiple hit application or a heated vacuum press.

Figure 9:
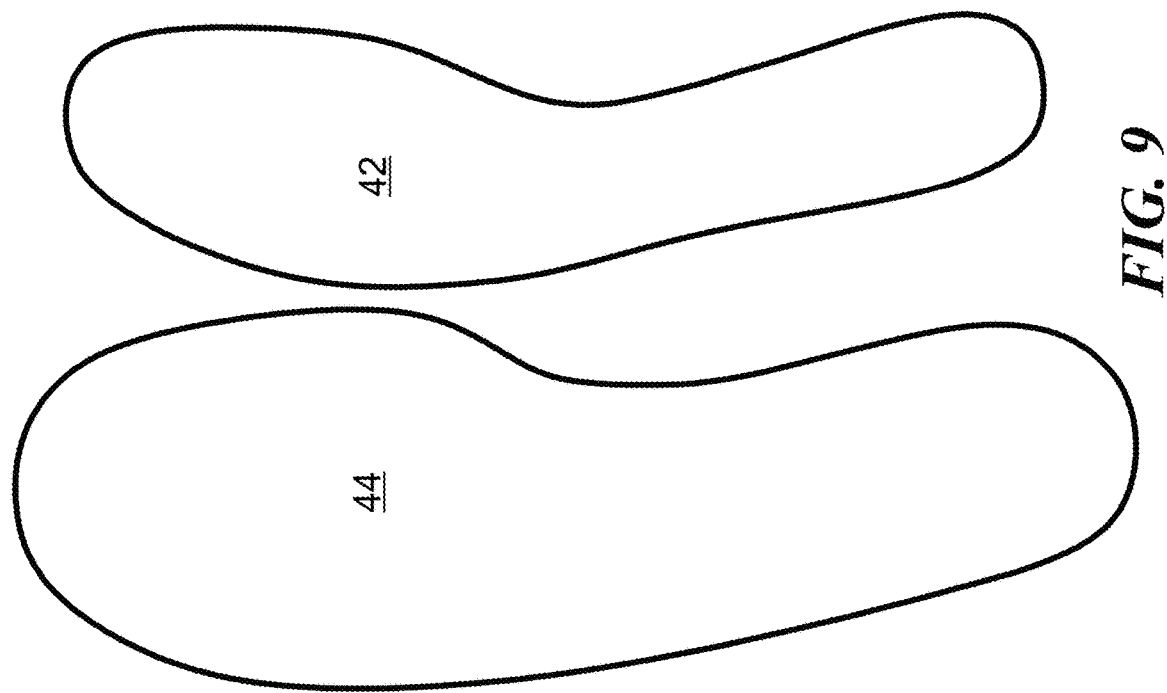
FIG. 9 is a plan view of a gasket material and adhesive membrane file seal gasket material for use with the bootie liner insert of FIG. 8.
Figure 8:
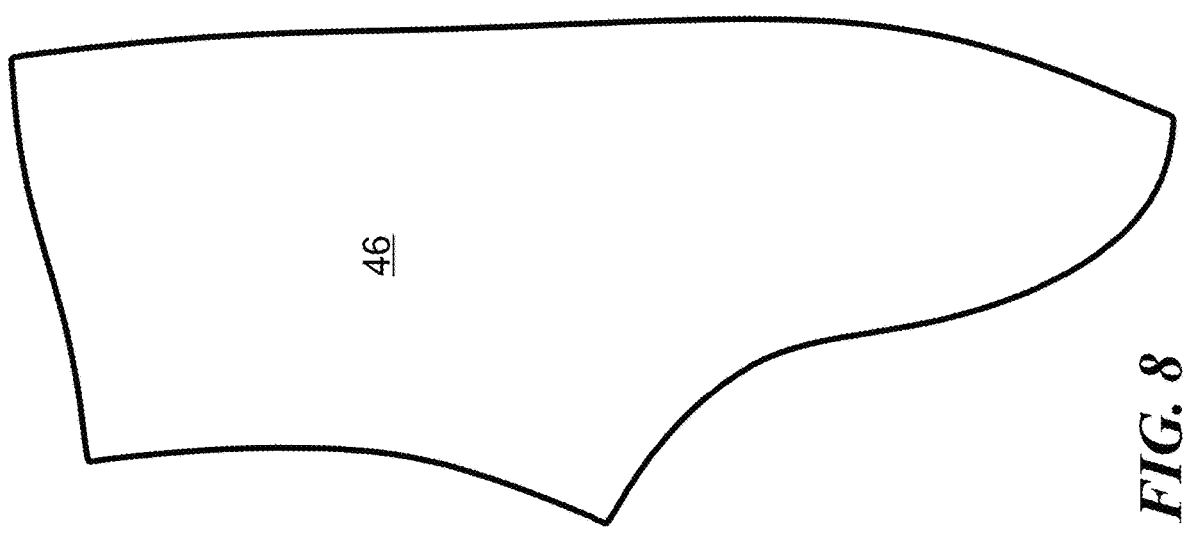
FIG. 8 is a view of a side piece of a further embodiment of a bootie liner insert according to the present invention.

In some embodiments, the bootie liner insert can include a full bottom. In other embodiments (see FIGS. 8 and 9), the bootie liner insert can include a fabric gasket material 42 and an adhesive membrane film seal gasket 44 to enclose the bottom of the bootie liner insert 46. For example, using a slip last to hold the three-dimensional structure formed as described above, a membrane barrier film flap around the bottom of the three-dimensional bootie liner insert can be pulled back and fabric gasket material can be sewn or welded in. The membrane barrier film flaps are folded over the sewn-in fabric gasket material. The fabric gasket material 42 can be brushed with a liquid glue. The adhesive membrane film seal gasket 44 is positioned over the glued surface of the fabric gasket and the membrane barrier film flaps and pressed at a suitable temperature and pressure setting, generally determined by the adhesive flow temperature. The slip last is removed to complete the process of inserting the three-dimensional bootie liner insert into the shoe or boot.

As noted above, the inner lining fabric panels can be sewn or welded together along one or more seams that allow the pattern to be pressed into a three-dimensional shape. The three-dimensional shape can be pressed using a three-dimensional vacuum formed lamination table (3D VFL). The VFL uses a heated vacuum press that includes a drilled vacuum convex or concave tool mold that is mounted to the table or vacuum press platen. The tool mold allows a three-dimensional inner lining fabric assembly to be pressed without flattening. The membrane barrier film can be subsequently fused to the inner lining fabric in the three-dimensional form, leaving flaps as described above.

A protective tricot layer or patch can be used in the above or any of the embodiments. In this case, a tricot material layer and a fusible adhesive layer can be cut and positioned in alignment on top of the membrane barrier film. The tricot layer and adhesive layer can be sized so that they does not interfere with the membrane barrier film sealing capabilities, so that the membrane barrier film can be sealed directly to the itself as described above, creating a seamless uniform film overlap. The protective tricot layer can also be undersized to allow the adhesive layer to become available to seal next to the membrane film flaps. In some applications, an abrasive patch may be used in high stress areas. The tricot layer or patch and adhesive are fused to the membrane barrier layer during the step of fusing the membrane barrier film to the inner lining fabric assembly with leaving a strip of the membrane barrier film unfused or soft set.

Subsequently, the protective tricot layer flaps can be unfolded to lie on top of each other, creating a seamless lamination process over the membrane film flaps. The tricot layer flaps are hard set thermally fused to finish the pressing sequence and to create the hydrostatic seam structure(s). The thermal fusing can be accomplished by using a flat or curved press for a single hit application, a fusing belt press for multiple hit application or a heated vacuum press.

In some applications, an insulation panel may be used. In this case, the insulation can be cut, positioned and fused within the required insulation surface areas and can be protected by the membrane film and the protective tricot fabric. In some embodiment, a fleece or a synthetic fiber insulation can be used. In some embodiments, the insulation panel can be an aerogel type of insulation, such as an AEROTHERM® gel pad, which can be placed between the membrane film and the inner lining fabric. In some embodiments, a type of insulation, such as Primaloft® insulation or Climashield® insulation, can be used.

Figure 10:
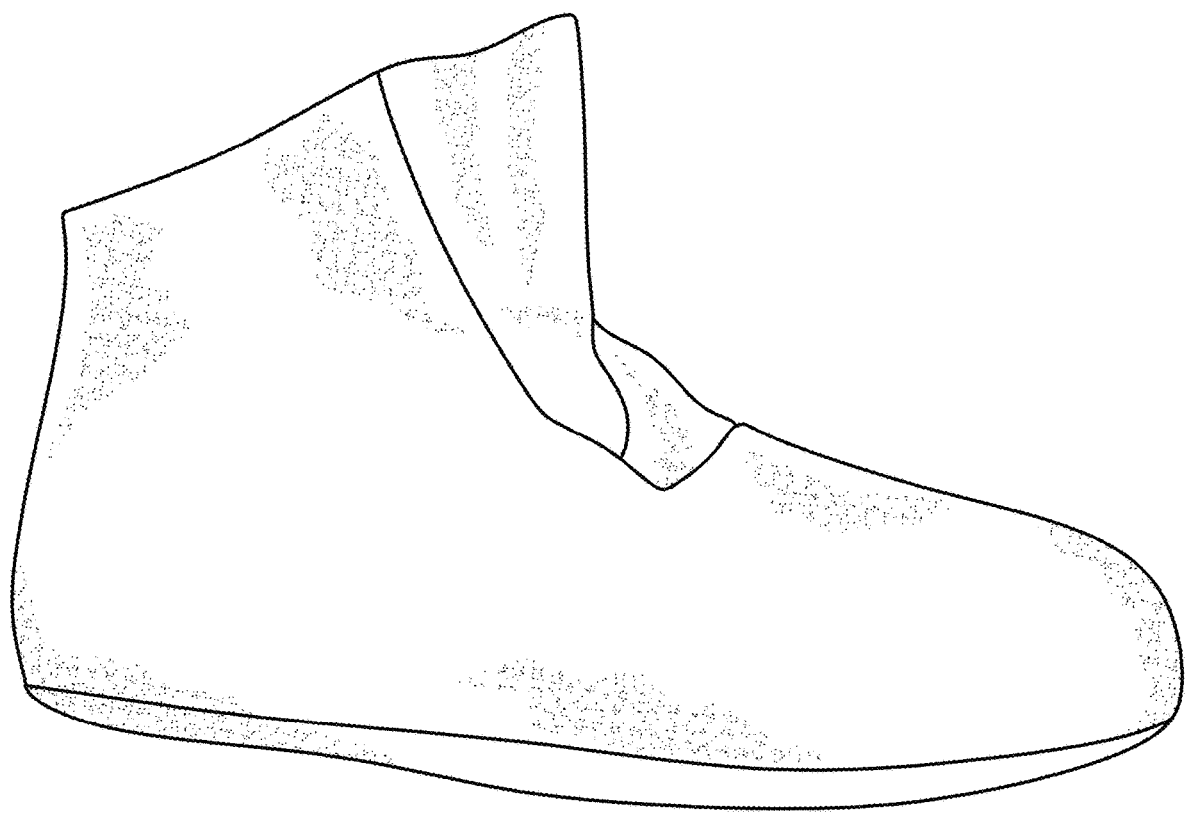
FIG. 10 is a side view of a bootie liner insert with expandable gusset.

If an expandable gusset is required, it can be made up as a separate fabric composite pattern panel. For example, an expandable gusset can be positioned in the tongue region between two side panels of a bootie liner insert. See FIG. 10. The expandable gusset can be insulated or uninsulated. The expandable gusset can be spring loaded by fusing a strip of the membrane film across the instep. The expandable gusset can be manufactured by using the same membrane film and the membrane protective fabric tricot flap technology.

Figure 16:
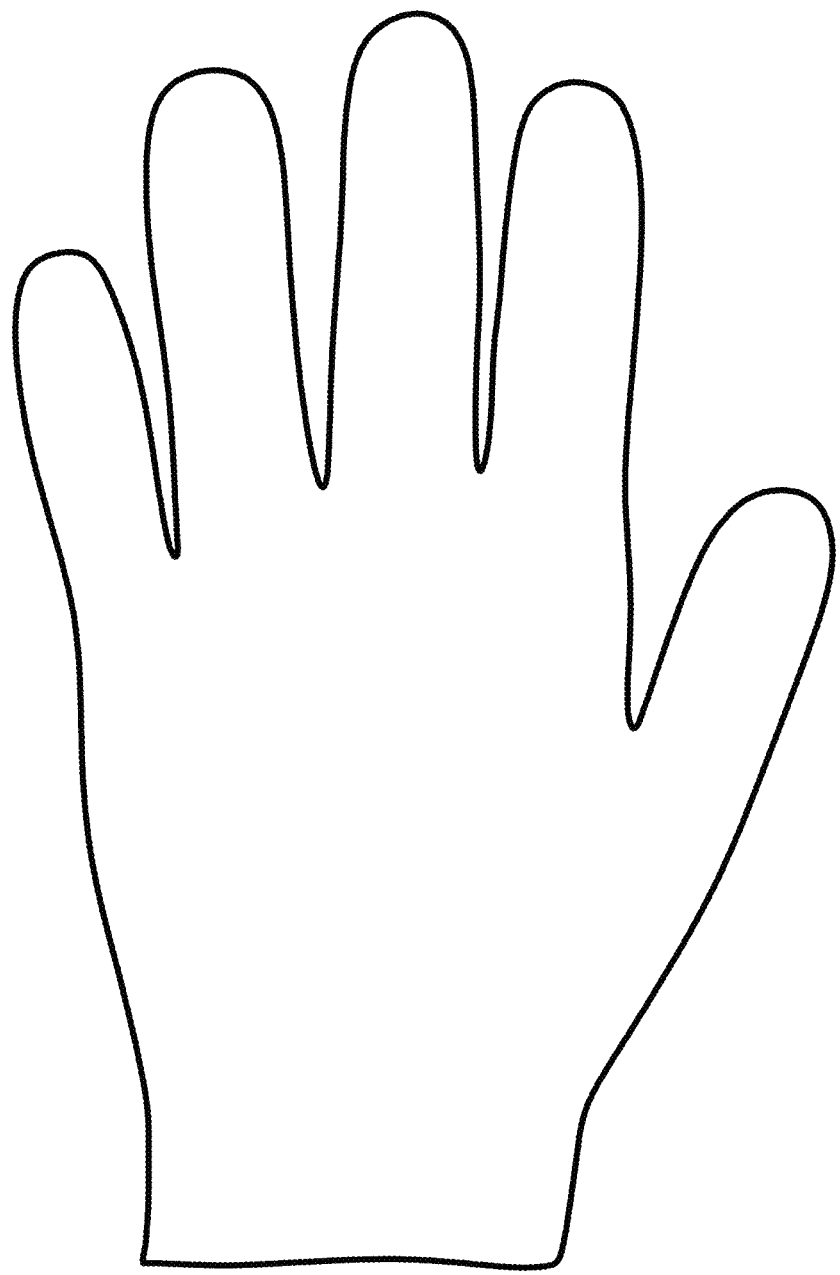
FIG. 16 is a schematic plan view of a glove liner insert.

The process can be used for fabricating liner inserts for other types of garments. For example, FIG. 16 is a schematic illustration of a glove liner insert.

Example 1

In one example, a vacuum-formed, laminated full bottom bootie liner insert can be assembled as follows:

1 Laminate a lining fabric and foam with a fusible adhesive, forming Package #1.
2 Provide a membrane barrier film as Package #2.
3 Optionally fuse an adhesive with a protective tricot fabric as Package #3.
4 Cut Package #1 into multiple panels to create the bootie liner insert pattern panels with a full bottom.
5 Seam together, by sewing or welding, the panels by seaming the heel seam and by seaming one side panel to one side of the bottom panel, forming an inner lining fabric assembly. The one side panel and the one side of the bottom panel can be sewn with a butt type seam affixing the edges of the fabrics together, edge to edge with a zigzag or straight stitch that allows the panels to be spread out flat in a two-dimensional shape without causing a crease or fold.
6 Cut the membrane barrier film of Package #2 to the outline shape of the pattern panels as a single piece covering the heel, both sides, and the bottom panel, allowing for overlapping membrane film flaps for sealing the areas around the left-open toe box seam, vamp seam and the bottom side seam. One of the sides of Package #2 can be cut to the distal edge of the panel, while the other side can be cut to allow for a membrane film flap to create a single film flap.
7 Optionally cut Package #3 to create a protective cover patch in the same pattern as the membrane barrier film from step #6 to form a protective cover patch #1.
8 Optionally cut Package #3 to create protective cover patches to cover the high stress areas to form a protective cover patch(es) #2.
9 Position the seamed inner lining fabric assembly into a pliable three-dimensional heated vacuum press.
10 Position a mold underneath the left-open bottom side seam surface to create a three-dimensional structure.
11 Position the membrane barrier film package from step #6 on top of the seamed inner lining fabric assembly.
12 Optionally position the protective cover patch #1 from step #7 on top of the membrane barrier film package.
13 Optionally position the protective cover patch(es) #2 from step #8 on top of the membrane barrier film package in specific high stress areas.
14 Heat, vacuum press the assembly to create a vacuum-formed laminate structure by thermally setting the adhesives together at a suitable temperature and pressure setting, ensuring that the membrane barrier film flaps and the protective cover patch #1 flaps are not sealed by adding release paper in the required areas.
15 Remove the laminated structure from the press.
16 Pull or fold back the membrane film flaps and the protective cover patch #1 flaps and seam closed the left-open toe box seam, vamp area seam and the bottom side seam surface areas to create a three-dimensional bootie liner insert.
17 Slip last the three-dimensional bootie liner insert.

18 Overlay the membrane film flaps on top of the closed toe box seam, vamp area seam and the bottom side seam surface areas and press to seal the contacting membrane barrier film flap surfaces together at suitable temperature and pressure settings.
19 Optionally overlay the protective cover patch #1 flap on top of the sealed membrane barrier film flap, and press to seal together at suitable temperature and pressure settings.
20 Take the slip lasted three-dimensional bootie liner insert and position it on the inside of a shoe or boot construction.
21 Thermally hard set the adhesives of the completed three-dimensional bootie liner insert through the shoe or boot construction process.
22 Remove the slip last to complete the three-dimensional bootie liner insert assembly process.

Example 2

In one example, a vacuum-formed, laminated full bottom bootie liner insert with expandable gusset assembly can be assembled as follows:
1 Laminate a lining fabric and foam with a fusible adhesive, forming Package #1.
2 Provide a membrane barrier film as Package #2.
3 Optionally fuse an adhesive with a protective tricot fabric as Package #3.
4 Cut Package #1 into multiple panels to create the bootie liner insert pattern panels with a full bottom and an expandable gusset.
5 Seam together, for example, by sewing or welding, the panels by seaming the heel seam, one side panel to one side of the bottom panel, and one side panel to one side of the expandable gusset panel on the instep, forming an inner lining fabric assembly. The seams can be sewn with a butt type seam affixing the edges of the fabrics together, edge to edge, with a zigzag or straight stitch that allows the panels to be spread out flat in a two-dimensional shape without causing a crease or fold.
6 Cut the membrane barrier film of Package #2 to the outline shape of the pattern panels from step #4 as a single piece covering the heel, both sides, the bottom panel, and the expandable gusset, allowing for overlapping membrane film flaps for sealing the areas around the left-open toe box seam, vamp seam, the bottom side seam, and expandable gusset seam. One of the sides of Package #2 can be cut to the distal edge of the panel, while the other side can be cut to allow for a membrane film flap to create a single film flap.
7 Optionally cut Package #3 to create a protective cover patch in the same pattern as the membrane barrier film from step #6 to form a protective cover patch #1.
8 Optionally cut Package #3 to create protective cover patches to cover the high stress areas to form a protective cover patch(es) #2.
9 Position the seamed inner lining fabric assembly into a pliable three-dimensional heated vacuum press.
10 Position a mold underneath the left-open bottom side seam surface and the expandable gusset side seam surface to create a three-dimensional structure.
11 Position the membrane barrier film package on top of the seamed inner lining fabric assembly.
12 Optionally position the protective cover patch #1 from step #7 on top of the membrane barrier film package.
13 Optionally position the protective cover patch(es) #2 from step #8 on top of the membrane barrier film package in specific high stress areas.
14 Heat, vacuum press the assembly to create a vacuum-formed laminate structure by thermally setting the adhesives together at a suitable temperature and pressure setting, ensuring that the membrane barrier film flaps and the protective cover patch #1 flaps are not sealed by adding release paper in the required areas.
15 Remove the laminated structure from the press.
16 Pull or fold back the membrane film flaps and the protective cover patch #1 flaps and seam closed the left-open toe box seam, vamp area seam, the bottom side seam, and expandable gusset side seam surface areas to create a three-dimensional bootie liner insert.
17 Slip last the three-dimensional bootie liner insert.
18 Overlay the membrane film flaps on top of the closed toe box seam, vamp area seam, the bottom side seam, and the expandable gusset side seam surface areas and press to seal the contacting membrane barrier film flap surfaces together at suitable temperature and pressure settings.
19 Optionally overlay the protective cover patch #1 flap on top of the sealed membrane barrier film flap, and press to seal together at suitable temperature and pressure settings.
20 Take the slip lasted three-dimensional bootie liner insert and position it on the inside of a shoe or boot construction.
21 Thermally hard set the adhesives of the completed three-dimensional bootie liner insert through the shoe or boot construction process.
22 Remove the slip last to complete the three-dimensional bootie liner insert assembly process.

Example 3

In one example, a two-panel, heel-seamed gasketed bootie liner insert can be assembled as follows:
1 Laminate a lining fabric and foam with a fusible adhesive, forming Package #1.
2 Provide a membrane barrier film as Package #2.
3 Optionally fuse an adhesive with a protective tricot fabric as Package #3.
4 Provide fabric gasket material and an adhesive membrane film seal gasket material as Package #4.
5 Cut Package #1 into two separate side panels to create the bootie liner insert pattern panels.
6 Seam together, for example, by sewing or welding, Package #4 in the heel seam to create a heel-sewn bootie liner insert with an open bottom, allowing it to be laid out flat with a two-dimensional shape.
7 Cut the membrane barrier film of Package #2 into a single piece that covers the sewn bootie liner insert, leaving membrane barrier film flaps for the left-open toe-box seam and vamp area seam, creating membrane barrier film pattern #1.
8 Optionally, cut the membrane barrier film of Package #2 into a single piece that covers the bootie liner insert pattern, leaving a membrane film flap surface for the toe-box seam, vamp area seam, and sides of the bootie liner insert to cover the sewn sides of the fabric gasket material opening, creating membrane barrier film pattern #2.
9 Optionally cut Package #3 to create protective cover patches, following the same pattern as in step #7, forming protective cover patch #1.
10 Optionally cut Package #3 to create protective cover patches to cover the high stress areas, forming protective cover patch(es) #2.
11 Cut Package #4 fabric gasket material to match the open bottom of the bootie liner insert pattern panels.
12 Cut Package #4 adhesive membrane film seal gasket to cover the bottom of the fabric gasket material and extend up the sewn or welded sides of the bootie liner insert pattern by a suitable width, such as ⅜ inch.

13 Lay out the heel seamed fabric bootie liner insert pattern panel to form a flat, two-dimensional shape.
14 Lay out the membrane barrier film pattern #1 on top of the bootie liner insert pattern panel into a flat two-dimensional shape, and press together at a suitable temperature and pressure setting to form a laminated structure.
15 Optionally lay out the protective cover patch #1 on top of the assembly into a flat two-dimensional shape, and press together at a suitable temperature and pressure setting, ensuring that the membrane barrier film flaps and the protective cover flaps are not sealed together by adding release paper in the required areas.
16 Optionally lay out the protective cover patch #2 on top of the assembly in specific high stress areas into a flat two-dimensional shape, and press together at a suitable temperature and pressure setting.
17 Pull or fold back the membrane barrier film flaps and the protective cover patch #1 flaps and seam the left-open toe box seam and vamp area seam.
18 Overlay the membrane barrier film flaps on top of the sewn toe box seam and vamp area seam, and press to seal the membrane barrier film to the membrane barrier film at suitable temperature and pressure settings.
19 Optionally overlay the protective cover patch #1 flaps on top of the sealed membrane film flaps, and press to seal together at suitable proper temperature and pressure settings.
20 Seam the cut fabric gasket material to the bottom of the inner lining fabric of the laminated structure to create a three-dimensional bootie liner insert. Optionally pull or fold back the membrane barrier film pattern #2 before seaming.
21 Slip last the three-dimensional bootie liner insert.
22 Glue the bottom and sides of the seamed fabric gasket material.
23 Optionally overlay the membrane film pattern #2 over the seamed and glued fabric gasket material.
24 Position the adhesive membrane film seal gasket on top of the assembly from step #22 or optionally step #23, and press at a suitable temperature and pressure setting.
25 Insert the slip lasted three-dimensional bootie liner insert inside a shoe or boot construction.
26 Thermally hard set the adhesives of the completed three-dimensional bootie liner insert through the shoe/boot construction process.
27 Remove the slip last to complete the three-dimensional bootie liner insert assembly process.

Example 4

In one example, a two-panel, full-sewn gasketed bootie insert liner can be assembled as follows:
1 Laminate a lining fabric and foam with a fusible adhesive, forming Package #1.
2 Provide a membrane barrier film as Package #2.
3 Optionally fuse an adhesive with a protective tricot fabric as Package #3.
4 Provide fabric gasket material and an adhesive membrane film seal gasket material as Package #4.
5 Cut Package #1 into two separate side panels to create the bootie liner insert pattern panels.
6 Seam, for example, by sewing or welding, Package #4 together in the heel seam, toe seam and vamp seam to create a full bootie liner insert pattern with an open bottom, allowing it to be laid out flat with a two-dimensional shape.
7 Cut one piece of Package #2 as a single piece that covers one side of the bootie liner insert pattern.
8 Optionally add the sides of the bootie to cover the sewn or welded side of the fabric gasket material opening, forming membrane film pattern #1.
9 Cut one piece of Package #2 into a single piece that covers the other side of the bootie liner insert pattern, leaving membrane film flap surfaces for the heel seam, toe-box seam and vamp area seam.
10 Optionally add the sides of the bootie to cover the sewn side of the fabric gasket material opening, forming membrane film pattern #2.
11 Optionally cut Package #3 to create protective cover patches, following the same pattern as in steps #6 and #7, forming protective cover patch #1 and protective cover patch #2.
12 Optionally cut Package #3 to create protective cover patches to cover the high stress areas.
13 Cut Package #4 fabric gasket material to match the open bottom of the bootie liner insert pattern.
14 Cut Package #4 adhesive membrane film seal gasket to cover the bottom of the fabric gasket material and extend up the seamed sides of the bootie liner insert pattern by a suitable width, such as ⅜ inch.
15 Lay out the seamed fabric bootie liner insert pattern to form a flat, two-dimensional shape. Press together at a suitable temperature and pressure setting.
16 Lay out the membrane film pattern #1 on top of the bootie liner insert formed in optional step #10, if appropriate, into a flat two-dimensional shape, and press together at a suitable temperature and pressure setting.
17 Flip over the protective cover patches #1 and #2 formed in optional step #11 and lay out the membrane film Package #2 in a flat two-dimensional shape, and press together at a suitable temperature and pressure setting.
18 Unfold the membrane film flaps on the heel seam, toe box seam and vamp area seam, and press to seal.
19 Optionally lay out the protective cover patch #1 on top of the side of the package #3 formed in optional step #12 to form a flat two-dimensional shape, and press together at a suitable temperature and pressure setting.
20 Optionally flip over the bootie liner insert pattern from step #15 and lay out the protective cover patch #2 on top of the side formed in step #13 to form a flat two-dimensional shape, and press together at a suitable temperature and pressure setting.
21 Optionally unfold the protective cover patch flaps on the heel seam, toe box seam and vamp area seam, and press to seal together at a suitable temperature and pressure setting.
22 Seam, for example, by sewing or welding, from step #9 the cut fabric gasket material to the bottom of the bootie liner insert pattern to create a three-dimensional bootie liner insert. Optionally pull back the membrane film flaps of steps #6 and #7 before seaming.
23 Slip last the three-dimensional bootie liner insert.
24 Glue the bottom and sides of the sewn fabric gasket material.
25 Optionally unfold the membrane barrier film flaps from step #7 over the sewn or welded and glued fabric gasket material.
26 Position the adhesive membrane film seal gasket and the optional membrane barrier film flaps on top of the seamed and glued fabric gasket material and press at a suitable temperature and pressure setting.
27 Take the slip-lasted, three-dimensional bootie liner insert and position it on the inside of a shoe or boot construction.

28 Thermally hard set the adhesives of the completed three-dimensional bootie liner insert through the shoe or boot construction process.
29 Remove the slip last to complete the assembly process.

Example 5

In a further example, a two-panel, full-sewn gasketed bootie with overlaid seam can be assembled as follows:
1 Laminate a lining fabric and foam with a fusible adhesive, forming Package #1.
2 Laminate a membrane film with a protective tricot fabric, forming Package #2.
3 Optionally provide a membrane barrier film as Package #3.
4 Optionally fuse an adhesive to a protective tricot fabric, forming Package #4.
5 Provide a fabric gasket material and an adhesive membrane film seal gasket material, forming Package #5.
6 Cut Package #1 into two separate side panels to create the bootie liner insert pattern panels.
7 Seam Package #1 together, allowing it to be laid out flat in a two-dimensional shape.
8 Cut two matching pieces of Package #2 into a single piece that covers each side of the bootie liner insert pattern, leaving an overlap surface (for example, 3/8 inch) for the heel seam, toe-box seam and vamp area seam, leaving the top and bottom of the bootie liner insert pattern open.
9 Optionally cut two matching pieces of Package #3 and Package #4 into a single piece that covers each side of the bootie liner insert pattern, leaving an overlaid surface (for example, 3/8 inch) for the heel seam, toe-box seam and vamp area seam, leaving the top and bottom opening open.
10 Cut Package #5 fabric gasket material to match the open bottom of the bootie liner insert pattern.
11 Cut Package #5 adhesive membrane film seal gasket to cover the bottom of the fabric gasket material and extend up the sewn sides of the bootie liner insert pattern by a suitable width, such as 3/8 inch.
12 Lay out the seamed fabric bootie liner insert in a flat, two-dimensional shape.
13 Lay out the pattern of Package #2 on top of the seamed fabric liner insert pattern of Package #1 in a flat two-dimensional shape, and press to fuse to Package #1 at a suitable temperature and pressure setting.
14 Flip over the assembly and lay out the other side of the Package #2 in a flat two-dimensional shape, and press to fuse the membrane film to Package #1 and seal the contacting surfaces of the membrane barrier film to create the hydrostatic seal, using a suitable adhesive set temperature.
15 Optionally lay out the #6 pattern of Package #3 on top of the seamed fabric liner insert pattern in a flat two-dimensional shape, and press to fuse the membrane barrier film to Package #1 at a suitable temperature and pressure setting.
16 Optionally flip over the assembly and lay out the other side of pattern of Package #3 in a flat two-dimensional pattern, and press to fuse the membrane barrier film to Package #1 and to seal the membrane barrier film to membrane barrier film to create the hydrostatic seal.
17 Optionally lay out the pattern of Package #4 on top of the seamed fabric liner insert pattern in a flat two-dimensional shape, and press to fuse to the membrane film, using a suitable adhesive set temperature.
18 Optionally flip over the assembly and lay out the other side of pattern of Package #4 in a flat two-dimensional shape, and press to the membrane barrier film, using a suitable adhesive set temperature.
19 Optionally trim the overlap surface if required.
20 Seam the cut-out fabric gasket material to the bottom of the bootie liner insert to create a three-dimensional liner insert.
21 Slip last the three-dimensional liner insert.
22 Glue the bottom and sides of the sewn fabric gasket material.
23 Position the adhesive membrane film seal gasket and press at a suitable temperature and pressure setting.
24 Position the slip-lasted, three-dimensional bootie liner insert inside of a shoe or boot construction.
25 Thermally hard set the adhesives of the completed three-dimensional bootie liner insert through the shoe or boot construction process.
26 Remove the slip last to complete the three-dimensional bootie liner insert assembly process.

Example 6

In a further example, a multiple-panel, partially-sewn gasketed bootie can be assembled as follows:
1 Laminate a lining fabric and foam with a fusible adhesive, forming Package #1.
2 Provide a membrane barrier film as Package #2.
3 Optionally fuse an adhesive with a protective tricot fabric as Package #3.
4 Provide fabric gasket material and an adhesive membrane film seal gasket material as Package #4.
5 Cut Package #1 into multiple side panels to create the bootie liner insert pattern panels.
6 Seam one side of the heel section leaving the other heel seam open, and seam the two front panels leaving the toe box seam open (in a V shape).
7 Cut Package #2 into a single piece that covers the bootie liner insert pattern panels, leaving membrane barrier film flap surfaces for the open heel seam, toe-box seam, vamp area seam, and the bottom of the bootie to cover over the fabric and the adhesive membrane film seal gasket material opening.
8 Optionally cut Package #3 to create protective cover patches.
9 Cut Package #4 fabric gasket material to match the open bottom of the bootie liner insert pattern.
10 Cut Package #4 adhesive membrane film seal gasket to cover the bottom of the fabric gasket material and extend up the sewn sides of the bootie liner insert pattern by a suitable width, such as 3/8 inch.
11 Lay out the seamed fabric bootie liner insert pattern panels in a flat two-dimensional shape.
12 Lay out the membrane barrier film on top of the assembly in a flat two-dimensional shape.
13 Optionally lay out the cut Package #3 protective cover patches on top of the assembly or in specific high friction surface areas.
14 Fuse the assemblies and optionally the cover patch(es) together at a suitable temperature and pressure setting.
   a) Leave the edges of the membrane film flap un-pressed over the left-open heel seam (by adding a piece of release paper between the fabric and the membrane film to leave an overlap film flap seam).
   b) Leave the edges of the membrane film flap un-pressed over the left-open toe-box seam (by adding a piece of release paper between the fabric and the membrane film to leave an overlap film flap seam).

c) Leave the edges of the membrane film un-pressed over the un-seamed fabric gasket (by adding a piece of release paper between the fabric and the membrane film to leave an overlap film flap seam).
d) Optionally leave the edges of the protective cover patches un-pressed over the left-open toe-box and vamp area seams (by adding a piece of release paper between the fabric and the membrane film flap to leave an overlap membrane film seam) to allow the membrane fold procedure to be performed first.

15 Peel or fold back the membrane film flaps and seam the left-open heel seam, toe-box seam and vamp seam area surfaces.
16 Unfold the un-pressed membrane film flaps over the closed seams and press at a suitable temperature and pressure setting.
17 Optionally unfold the un-pressed protective cover patch flaps over the membrane film flaps and press at a suitable temperature and pressure setting.
18 Pull back the membrane film flaps and seam the cut-out fabric gasket material to the bottom of the bootie liner insert to create a three-dimensional bootie liner insert.
19 Slip last three-dimensional bootie liner insert.
20 Glue the bottom and sides of the sewn fabric gasket material.
21 Unfold the un-pressed membrane film flaps over the seamed and glued fabric gasket material.
22 Position the adhesive membrane film seal gasket and the optional membrane barrier film flaps on top of the seamed and glued fabric gasket material and press at a suitable temperature and pressure setting.
23 Position the prefabricated slip lasted three-dimensional bootie liner insert on the inside of a shoe or boot construction.
24 Thermally hard set the adhesives of the completed three-dimensional bootie liner insert through the shoe or boot construction process.
25 Remove the slip last to complete the three-dimensional bootie liner insert assembly process Example 7

In a further example, an inner fabric, single- or multiple-full sewn panel bootie with outer membrane single panel can be assembled as follows:
1 Laminate a lining fabric and foam with a fusible adhesive, forming Package #1.
2 Provide a membrane barrier film as Package #2.
3 Optionally fuse an adhesive with a protective tricot fabric as Package #3.
4 Provide fabric gasket material and an adhesive membrane film seal gasket material as Package #4.
5 Cut Package #1 in a single or a multiple panel to create the bootie liner insert pattern panels. Note that the bootie liner insert pattern panel would be a different height than the #5.
6 Cut Package #2 into a single piece that covers the bootie liner insert pattern panels, leaving membrane film flap surfaces for the toe box seam, vamp area, and the bottom of the bootie to cover over the fabric and the adhesive membrane film seal gasket material opening. Note that the membrane barrier film pattern can have a different height than the cut Package #1, for example, if the membrane barrier film is intended to cover just the bottom portion of the bootie liner insert.
7 Optionally cut Package #3 to create protective cover patches.

8 Cut the fabric gasket material to match the open bottom of the bootie liner insert pattern.
9 Cut a single piece of the adhesive membrane film seal gasket to cover the bottom of the fabric gasket material and extend up the sewn sides of the bootie liner insert pattern by a suitable width, such as ⅜ inch.
10 Seam the heel section and the single or multiple front panels, leaving the toe-box and vamp seam open (in a V shape).
11 Lay out the inner lining fabric assembly pattern in a flat two-dimensional shape.
12 Lay out of the membrane barrier film pattern on top of the inner lining fabric assembly in a flat two-dimensional shape.
13 Optionally lay out the cut Package #3 protective cover patches on top of assembly from step #11 in specific high friction surface areas.
14 Fuse the assemblies together at a suitable temperature and pressure setting.
a) Leave the edges of the membrane film flaps un-pressed over the left-open toe box seam and vamp area seam (by adding a piece of release paper between the fabric the membrane film to create an overlap membrane film flap seam).
b) Leave the edges of the membrane film flaps un-pressed over the un-seamed fabric gasket (by adding a piece of release paper between the fabric and the membrane barrier film to create an overlap flap seam).
c) Optionally leave the edges of the protective cover patches un-pressed over the left-open toe-box seam and vamp area seam (by adding a piece of release paper between the fabric and the membrane film flap to leave an overlap membrane film seam) to allow the membrane fold procedure to be performed first.

15 Peel or fold back the membrane barrier film flaps and stitch the left-open toe-box seam and vamp area seam.
16 Unfold the un-pressed membrane film flaps over the seams and press at a suitable temperature and pressure setting.
17 Optionally unfold the un-pressed protective cover patch flaps from the assembly over the membrane barrier film flaps and press at a suitable temperature and pressure setting.
18 Pull back the membrane barrier film flaps and stitch the cut fabric gasket material to the bottom of the bootie liner insert to create the three-dimensional bootie liner insert.
19 Slip last the three-dimensional bootie liner insert.
20 Glue the bottom of the sewn fabric gasket material.
21 Unfold the un-pressed overlapping membrane film flaps over the seamed and glued fabric gasket material from step #16.
22 Position the adhesive membrane film seal gasket on top of the overlapping flaps and the seamed and glued fabric gasket material and press at a suitable temperature and pressure setting.
23 Position the slip-lasted, three-dimensional bootie liner insert inside a shoe or boot construction.
24 Thermally hard set the adhesives of the completed three-dimensional bootie liner insert through the shoe or boot construction process.
25 Remove the slip last to complete the three-dimensional bootie liner insert assembly process.

Example 8

In a further example, a gusset fabric pattern panel can be assembled as follows:

1 Laminate a lining fabric and foam with a fusible adhesive, forming Package #1.
2 Cut Package #1 into a single, expandable gusset fabric pattern panel.
3 Seam together the heel seam, toe seam, vamp seam and one side of the expandable gusset fabric pattern panel to the instep, leaving the other side of the expandable gusset un-seamed to create a full bootie with an open bottom, allowing it to be laid out in a flat two-dimensional shape.
  a) The expandable gusset can be positioned between the two-panel heel or full seamed gasketed bootie liner insert.
  b) The expandable gusset could be insulated or uninsulated.
  c) The expandable gusset could be spring loaded by fusing a strip of the membrane barrier film (for example, a 3"×1" piece) across the instep.
  d) The expandable gusset could be manufactured by using the same membrane barrier film and the membrane protective fabric tricot flap technology.

Examples of a fabrication process for a glove liner insert are as follows:

Example 9

In one example, a two-dimensional fabrication process, such as for a glove and glove liner insert, can be assembled as follows:
1 A fabric pattern is sewn or knit, which includes an inner liner fabric pattern and an outer shell liner fabric pattern, if required.
2 The fabric pattern(s) is (are) inserted onto a 2D form to stretch out. The inner liner fabric pattern does not need to be turned inside out to have access to the outer surface of the fabric. The outer shell fabric pattern must be turned inside out to allow access to the inner surface of the fabric.
3 Cut a membrane barrier film (which can include a membrane barrier film with adhesive layer or a self-adhering membrane barrier film) to cover over the above fabric pattern components, providing an overlap seal to allow the membrane barrier film to seal upon itself, as described above. The membrane barrier film can be cut into two distinct pieces to cover the top and bottom of the fabric pattern, or it can be cut into one piece that allows it to be folded over the top and bottom of the fabric pattern.
4 Provide a heated platen press surface to create an outline shape of the membrane barrier film overlap seal and the flat surface adhesion to the stretched-out fabric pattern, top and bottom. Optionally, the membrane barrier film seal can be created first, which secures the membrane barrier film to the stretched out fabric pattern around the edges, eliminating the flat surface adhesion step.
5 Hard set press the membrane barrier film on top of the fabric pattern components to seal the membrane barrier film to create the hydrostatic membrane barrier film seal and to create the adhesive bond to the fabric pattern surfaces, top and bottom.
6 Optionally fold over and press the overlap seal of the adhesive membrane composites from the edges of the fabric pattern components and heat seal if required.
7 Optionally if an outer shell pattern is required, stretch the outer shell fabric pattern over the stretched out two-dimensional form above, and hard set press the assembly to create the bond between both fabric surfaces together.
8 Sew the open wrist areas of the two fabric patterns to complete the process.

Example 10

In one example, a three-dimensional fabrication process, such as for a glove and glove liner insert, can be assembled as follows:
1 A three-dimensional glove liner insert pattern is seamed, leaving the thumb seam open and un-seamed with a butt type seam affixing the edges of the fabrics together, edge to edge, for example, with a zigzag or straight stitch that would allow the glove and thumb fabric panels to be spread out without causing a crease or fold, forming Package #1.
2 Fuse an adhesive, membrane barrier film, top adhesive and an optional carrier film, forming Package #2.
3 Cut Package #2 into two pieces that cover the top and bottom of the three-dimensional glove liner insert pattern, leaving a membrane film barrier flap surfaces for the open and unsewn thumb seam(s) and around the perimeter of the sealing platen pattern.
4 Insert the glove liner insert pattern into a stretched out 2D form, laying flat.
5 Lay out the Package #2 pattern on the top and bottom of glove liner insert pattern from step #4, in a flat, two-dimensional shape.
6 Fuse the glove liner insert pattern and Package #2 together using a three-dimensional heated vacuum press at a suitable temperature and pressure setting.
  a) Seal the membrane barrier film to the membrane barrier film creating the hydrostatic seal.
  b) Leave the edges of the membrane barrier film flaps un-pressed over the unsewn thumb seam areas (by adding a piece of release paper between the fabric and the membrane film flap to leave an overlap membrane film seam).
  c) Leave the top adhesive and the carrier untouched.
7 Peel back the membrane barrier film flaps and sew the left open thumb seam(s) area.
8 Insert the glove liner insert into a three-dimensional glove form to create a three-dimensional glove liner insert.
9 Peel back the carrier film of the un-pressed membrane barrier film flaps and fold over onto the sewn thumb seam(s) and press at a suitable temperature and pressure setting.
10 Peel off the optional carrier film.
11 Position a premade outer shell glove pattern on top of the three-dimensional glove liner insert.
12 Thermally hard set the adhesives of the completed three-dimensional glove liner insert through the glove construction process.
13 Remove the three-dimensional glove form to complete the assembly process.

Optionally, panels incorporating an insulation package can be provided. An insulation package is cut as a single piece having an outline shape to cover an inner lining fabric, allowing for overlapping flap surfaces around seams that are left open. The insulation piece can be positioned over the inner lining fabric, before the membrane barrier film is positioned. The membrane barrier film can fully cover the insulation piece.

Example 11

In a further example, a vacuum-formed, laminated full bottom bootie with insulation can be assembled as follows:
Cut a piece of an insulation package as a single piece having an outline shape to cover the heel, both sides, and bottom panel of a bootie insert liner, allowing for an insulation overlap flap surface around the unsewn toe box seam, vamp seam and the bottom side seam surface areas to form an insulation panel. The insulation panel can be positioned on top of a laminated a lining fabric and foam package (as described above), before the membrane barrier film package is positioned. Thus, the membrane barrier film package is positioned on top of the insulation package. An optional protective cover patch can be positioned on top of the membrane barrier film package.

Example 12

In a further example, a two-panel gasketed bootie heel sewn assembly with insulation can be assembled as follows:

Cut a piece of the insulation package into a single piece that covers the sewn bootie liner insert pattern, leaving insulation overlap flap surfaces for the toe box seam and vamp area seam, to form an insulation panel. The insulation panel can be positioned on top of the laminated lining fabric and foam package (as described above), before the membrane barrier film package is positioned. Thus, the membrane barrier film package is positioned on top of the insulation package. An optional protective cover patch can be positioned on top of the membrane barrier film package.

Example 13

In a further example, a two-panel gasketed bootie full sewn overlaid seam with insulation can be assembled as follows:

Cut two matching pieces of the insulation package into a single piece that covers each side of the bootie liner insert pattern, leaving insulation overlap flap surface for the heel seam, toe-box seam and vamp area seam, to from insulation panels. The insulation panels can be positioned on top of the laminated lining fabric and foam package (as described above), before the membrane barrier film package is positioned. Thus, the membrane barrier film package is positioned on top of the insulation package. An optional protective cover patch can be positioned on top of the membrane barrier film package.

Example 14

In a further example, a multiple-panel gasketed bootie with insulation can be assembled as follows:

Cut a piece of the insulation package into a single piece that covers the bootie liner insert pattern, leaving insulation overlap flap surfaces for the heel seam, toe-box seam, vamp area seam. The insulation panel can be positioned on top of the laminated lining fabric and foam package (as described above), before the membrane barrier film package is positioned. Thus, the membrane barrier film package is positioned on top of the insulation package. An optional protective cover patch can be positioned on top of the membrane barrier film package.

Example 15

In a further example, an inner fabric single- or multiple-panel with outer membrane single panel bootie and with insulation can be assembled as follows:

Cut a piece of the insulation package into a single piece that covers the bootie liner insert pattern, leaving insulation overlap flap surfaces for the toe box seam, vamp area seam. The insulation panel can be positioned on top of the laminated lining fabric and foam package (as described above), before the membrane barrier film package is positioned. Thus, the membrane barrier film package is positioned on top of the insulation package. An optional protective cover patch can be positioned on top of the membrane barrier film package.

In the embodiments and examples described herein, any suitable adhesive can be used. The adhesive could be a solid film adhesive, a micro-dot adhesive, a nano-dot adhesive, a powder adhesive or a web adhesive. The surface area or the micro-dot placement of the adhesive can be adjusted, depending on the desired fiber surface tension. The adhesive can be, for example, and without limitation, a polyethylene or a polyurethane. The adhesive can be cross linked to reduce fabric shrinkage.

The protective fabric can be a tricot fabric. The tricot fabric can be, for example and without limitation, a polyethylene or a polyurethane. The tricot fabric can be coated with, for example and without limitation, a polyethylene, a polyurethane, or an adhesive.

The adhesive membrane film seal gasket can be, for example and without limitation, a cotton scrim, polyethylene, polyurethane.

The insulation panels could be a continuous filament, such as CLIMASHIELD® insulation. The insulation panels could be of various thicknesses to provide different Clo values. An insulation patch can be, for example and without limitation, an AeroTherm® thermal gel or a thermal insulation such as CLIMASHIELD® insulation.

The process described herein can result in a membrane barrier film that is uniform and is not compromised, because the edges of the membrane barrier film flaps are overlapped and sealed by the membrane barrier film, creating a hydrostatic bond. The overlapped membrane barrier film flaps can eliminate the need for traditional seam tape or additional adhesives.

The hydrostatic values of the membrane barrier film can be equal to the hydrostatic value of the uniform laminated membrane film surface area. The barrier qualities of the membrane barrier film can be equal to the barrier qualities of the uniform laminated membrane film surface area.

The flat heat press with a variable height platen can increase or decrease the surface adhesion of the adhesive composite to a specific area. The flat heat press with a variable height platen or a micro-dot platen can increase the surface adhesion area and allow a higher moisture vapor transmission rate (MVTR).

A TPU membrane barrier film or a co-polyester membrane barrier can melt into the inner lining fabric's surface, which creates a lower mil barrier surface area.

The thermal fusing can be accomplished by using a flat press for a single hit application, an in line fusing belt press for multiple hit applications or by using a three-dimensional heated vacuum press, for example, similar to a Drytac PR 5198 Hydraulic Hardbed Press with a rubber conforming/pliable cover sheet.

The 3D thermal fusing can be accomplished by using a vacuum formed lamination table using a heated, vacuum press by positioning a drilled vacuum convex/concave tool mold and by mounting the tool mold to the table or vacuum press platen to allow the three-dimensional vacuum formed lamination liner insert to be pressed without flattening to two dimensions.

In other variations, the membrane barrier film can be slit to crate ventilation outlets in the liner insert, for example, on the sides of the upper part of the bootie liner insert, or in any other areas where open ventilation is desired. The membrane barrier film can be positioned in selective areas of the liner insert.

In another aspect of the fabrication process, a ruche pattern is used to provide a moisture resistant membrane barrier film for a stretchable garment or garment segment. As used herein, a ruche can be a fold or gather in a fabric that can expand when the fabric is stretched or subjected to a tensile force in at least one direction. A ruche includes a slack segment of fabric when the fabric is in a relaxed state in which no tensile force is applied to the fabric in at least one direction. A ruche pattern as used herein includes a fabric such as a membrane barrier film that includes one or more ruches.

Stretchable garments include, without limitation, sweaters, jackets, socks, booties, boot liners, mittens, or gloves. Stretchable garment segments include, without limitation, cuffs or waistbands.

Figure 11:
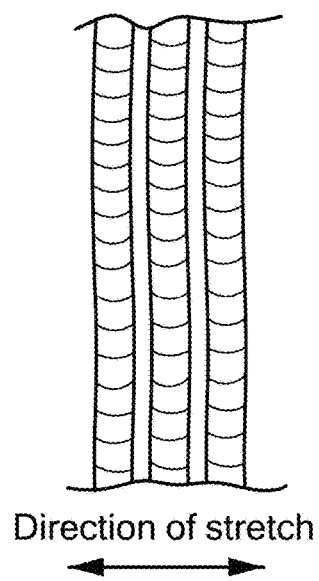
FIG. 11 is a schematic illustration of a rib knit pattern of a stretchable garment section.
Figure 12:
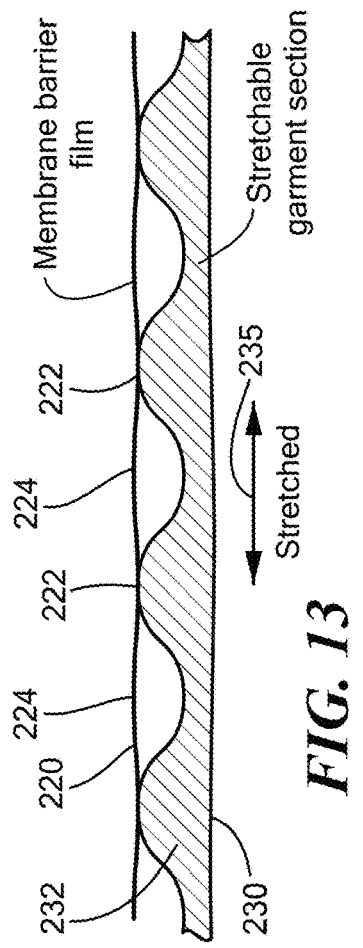
FIG. 12 is a schematic cross section of a membrane barrier film adhered to a stretchable garment section in a relaxed state.
Figure 13:
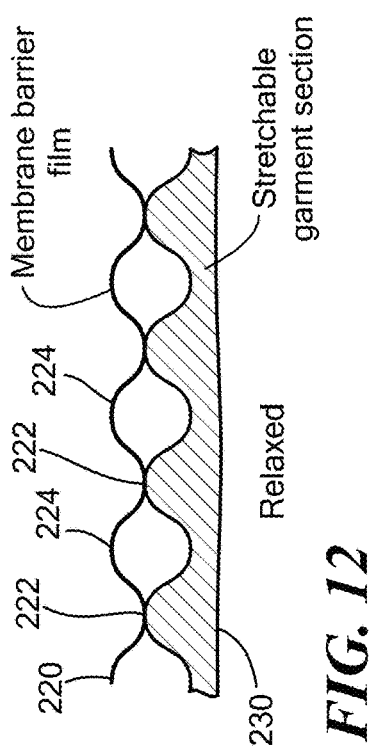
FIG. 13 is a schematic cross section of a membrane barrier film adhered to a stretchable garment section is a stretched state.
Figure 15:
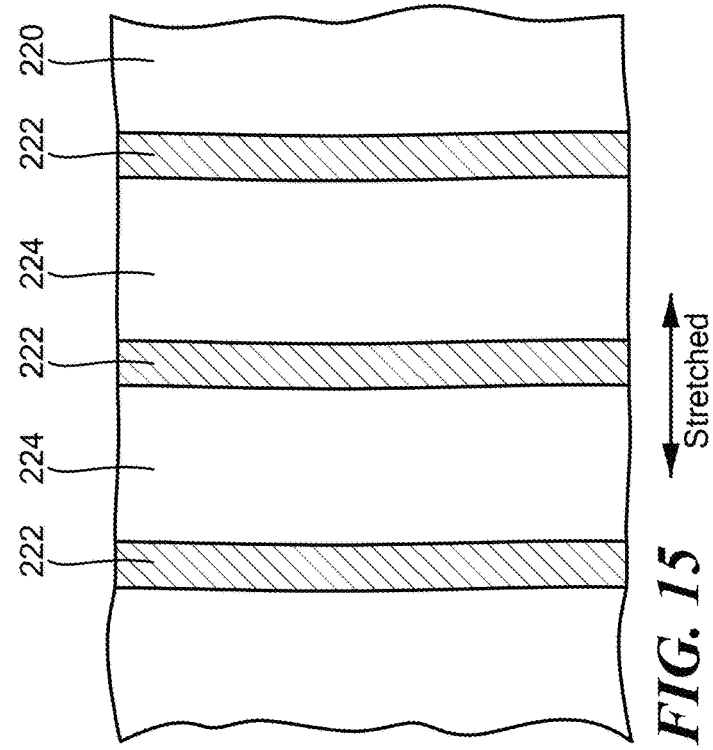
FIG. 15 is a plan view of a membrane barrier film adhered to a stretchable garment section in a stretched state.
Figure 14:
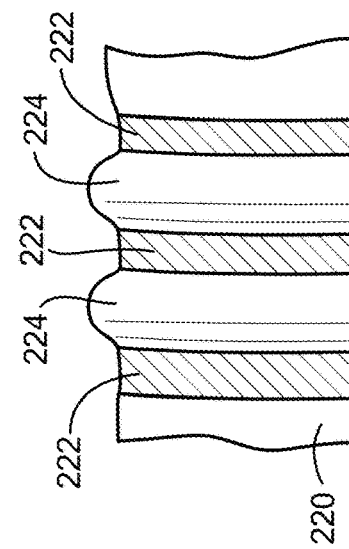
FIG. 14 is a plan view of a membrane barrier film adhered to a stretchable garment section in relaxed state.

The stretchable section of the garment is generally formed by a knit pattern, such as a rib knit pattern. The direction of stretch is generally transverse to the longitudinal direction of the ribs in the rib knit pattern. See FIG. 11. The rib knit pattern also provides a three-dimensional surface texture, such that some fibers protrude above other fibers. For example, the fibers in the longitudinal ribs protrude above other fibers in the stretchable section. There are many variations of knit patterns that provide stretch and a three-dimensional surface texture, and any such pattern can be used. The stretchable section of the garment can also be formed from woven or non-woven fabrics, for example, if stretchable or elastic fibers are employed.

The garment or garment segment can be made from a variety of fibers, such as polyester, nylon, lycra, and the like, as is known in the garment field. Various fiber weights can be used, such as 18/1, 22/1, etc. The stretchable section can also be knit or otherwise fabricated from multiple types of fibers that provide different characteristics for adhering to the membrane barrier film, described further below.

Referring to FIGS. 12-15, the membrane barrier film 220 is adhered to the stretchable section 230 of the garment along spaced or discontinuous segments transverse to the direction of stretch 235, for example, along outer edges 232 of the ribs that protrude from the rib knit pattern on one side of the garment. The intermediate segments 224 of the membrane barrier film between the adhering segments 222 are not adhered to the garment, forming the ruches. The intermediate segments of the membrane barrier film contain sufficient slack such that, when the garment is relaxed, the intermediate segments of the membrane barrier film fold or puff up in ruches between the adhering segments. When the garment is stretched or expanded, the intermediate segments or ruches of the membrane barrier film flatten out. In fabrication, the stretchable garment section is stretched over a two-dimensional platen and the membrane barrier film is adhered to the section while in this stretched state, as described further below.

Thus, the ruche pattern allows a membrane barrier film having no stretch or less stretch than the garment section to be used to provide a moisture barrier to a stretchable garment. The ruche pattern keeps the membrane film from being overstretched, weakened or compromised.

The membrane barrier film can be as described above. Examples include, without limitation, a polyethylene (PE), a polyurethane (PU), expanded polytetrafluoroethylene (ePTFE), polytetrafluoroethylene (PTFE), etc. The membrane film can be a breathable type or a non-breathable type.

The membrane film can be stretchable with recovery or non-stretchable type non-recovery type, although it has less stretch than the garment.

Any suitable adhesive can be used to adhere the membrane barrier film to the stretchable garment section. The adhesive can be a film adhesive, micro dot adhesive, nano dot adhesive, powder adhesive or a web adhesive. The adhesive could be a polyethylene (PE), a polyurethane (PU), etc. The weight of the adhesive can be adjusted dependent on the required fiber surface tension.

The adhesive is applied to at least one side of the membrane barrier film. The adhesive can be applied to the film as a continuous layer, as micro dots or nano dots, or in discrete areas that align with the ribs where the membrane barrier film is to be adhered to the garment. For example, a web adhesive can be die cut into a linear or grid pattern that aligns with the ribs of the knit pattern when the garment section is stretched on the platen.

In one embodiment, the outer ridge of the rib pattern is knit with a fiber that is thermally responsive to an adhesive while the inner rib ridge of the rib pattern is knit with a fiber that is not thermally response to the adhesive. Also, the fibers do not degrade or melt at the temperature used for adhering the adhesive to the fibers. For example, the outer rib ridge fibers can be a polyester material that is thermally response to the adhesive but will not degrade or melt at ±250° F. The inner rib ridge fiber can be a Teflon® fiber that is not thermally responsive to an adhesive and will not degrade or melt at ±250° F.

As noted above, after the stretchable garment or garment section is fabricated, generally by knitting in the desired pattern, it is stretched over a two-dimensional platen which is heated to set the adhesive on the membrane barrier film. A vacuum can also be pulled on the platen to help retain the garment or garment section to the platen. The barrier membrane film is placed on the garment with the adhesive in contact with the garment at the outer or protruding rib locations. The membrane barrier film is then fused to the garment while the garment is in the stretched configuration. Pressure can also be applied externally. The time, pressure and temperature of the heated platen surface can be adjusted for the fabric thickness of the stretchable garment or garment section and for the type of thermally responsive fiber forming the outer ridge of the rib pattern of the garment or garment section. Similarly, the vacuum of the heated platen surface can be adjusted for the fabric thickness of the garment or garment section and for type of fibers used in the outer ridge of the rib pattern of the garment or garment section.

In another embodiment, particularly if a continuous layer of adhesive or micro dots or nano dots of adhesive have been applied to the membrane barrier film, a number of elements, such as small tubes or rods, can be inserted between the membrane barrier film and the garment at the intermediate segments (where no adhesion between the barrier film and the garment is needed). The elements are of a material, such as a PTFE, for example Teflon®, that is resistant to the fusion process and prevent the adhesive from adhering to the garment or garment section in between the adhering segments. The elements are removed after the fusion. The elements can be of various sizes, shapes and quantities, dependent upon the stretch characteristics of the garment, the size of the garment, the size of the rib knit pattern, and the like.

Edges of the membrane barrier film can be sealed together where needed at garment edges or seams.

Example 16

In one example of a fabrication process for a sock, bootie, or boot liner, the steps are as follows:

1 Knit a pure finish stretch prefabricated sock or bootie. Optionally, sew a sock pattern together to create a prefabricated sock. The sock can be knit in any of various styles, such as mini crew, crew, etc., depending on the required shoe or boot lining fabric height.

A 1×1 rib pattern or other rib pattern that provides a great deal of stretch is knitted in various areas of the sock. The outer ridge of the rib pattern is knit with a fiber that is thermally responsive to an adhesive and will not degrade or melt at ±250° F., such as a polyester fiber, etc., thereby creating a continuous adhesion surface.

The inner rib ridge of the rib pattern is knit with a fiber that is not thermally responsive to an adhesive and will not degrade or melt at ±250° F., such as Teflon® fiber, etc., thereby creating a discontinuous adhesion surface.

Knit a pure finish flat knit stretch garment lining fabric, creating a continuous adhesion surface for the membrane barrier film.

2 Pre-fuse an adhesive to one side of a membrane barrier film to create an adhesive and membrane film composite, creating a continuous adhesive surface.

3 Pre-fuse an adhesive to the other side of the membrane barrier film using a template or a die cut pattern of the adhesive to create an adhesive and membrane film composite, creating a dis-continuous adhesive surface. The template or die cut pattern conforms to the rib pattern when the sock of bootie is stretched out.

Optionally, the adhesive can be fused to both sides of the membrane film surfaces. Also optionally, the adhesives can be fused to both sides of the knit pure finish outer prefabricated sock inner surface, creating a discontinuous membrane adhesion surface.

Optionally, the surface between the adhesive and the membrane can be displaced by inserting removable tubes, made, for example of Teflon™. The tubes can be of various sizes, shapes and quantities, dependent upon the stretch characteristics of the knit fabric to the membrane surface, creating a discontinuous membrane adhesion surface.

4 Create a 2D platen in the shape of the prefabricated sock. The 2D sock platen width is adjusted to the stretch characteristics of the prefabricated sock.

5 Die-cut the adhesive and membrane composites or the adhesive and the membrane separately to the outline shape of the stretched prefabricated sock.

Leave a ±¼" sealing area available to allow the membrane to be fused to the membrane, creating the membrane film hydrostatic seal.

The die-cut membrane film adhesive outline sock shape can be adjusted to the area of the sock where the waterproof membrane film adhesive surface is required, for example, a foot section.

6 Turn the prefabricated sock inside out so that the inner fabric surface of the sock is facing outwards.

7 Stretch out the prefabricated sock onto the 2D sock platen exposing the inner fabric surface.

8 Position the die-cut adhesive and membrane composites or the separate adhesive and membrane film over and under the stretched out prefabricated sock, with adhesive facing the fiber side.

Optionally, insert the removable tubes between the adhesive and the membrane surface.

9 Fuse the die-cut adhesive and membrane film composite or the separate adhesive and membrane film with a 2D top and bottom heated platen to thermally set the responsive adhesive surface of the outer ridge of the rib pattern sock fibers.

Optionally, pre-fuse the separate die-cut adhesive with a 2D top and bottom heated platen to thermally set the responsive adhesive surface of the outer ridge of the rib pattern sock fibers. Then fuse the separate die-cut membrane film into position.

Optionally, remove the removable tubes between the adhesive and the membrane surface creating the ruche pattern.

Time, pressure and temperature of the heated platen surface can be adjusted for the fabric thickness of the outer prefabricated sock and for the type of thermally responsive outer ridge of the rib pattern fiber of the outer prefabricated sock.

The vacuum of the heated platen surface to set the adhesives can be adjusted for the fabric thickness of the outer prefabricated sock and for type of fibers used in the outer ridge of the rib pattern of the outer prefabricated sock.

10 Roll over the ±¼" adhesive side surface of the membrane film adhesive composite sealed seams over the 2D sock outlined edges to flatten and thermally heat set the seam surfaces to complete the hydrostatic sealing process.

11 Remove the waterproof (WP) bootie insert liner from the 2D sock platen.

12 Slip last the WP bootie insert liner over the boot or shoe lining fabric to create the waterproof boot/shoe.

13 Optionally, if the adhesive is fused to both sides of the membrane film surfaces, then the adhesive can be used to thermally set to the inside surface of the boot or shoe outer shell fabric/leather.

Example 17

In an example of fabricating a ruche pattern, seam tapeless waterproof membrane garment assembly, the steps are as follows:

1 Knit a pure finish stretch garment lining fabric. Various styles, dependent on the required garment lining pattern, i.e. fleece, tricot, etc., can be used.

Knit a 1×1 rib pattern or other rib pattern that provides a great deal of stretch. Knit the outer ridge of the rib pattern with a fiber that is thermally responsive to an adhesive and will not degrade or melt at ±250° F., such as polyester fiber, etc., creating a continuous adhesion fiber surface.

Knit the inner rib ridge of the rib pattern with a fiber that is not thermally responsive to an adhesive and will not degrade or melt at ±250° F., such as Teflon® fiber, etc., creating a discontinuous adhesion fiber surface.

When the inner garment liner fabric is relaxed the membrane film creates a ruche effect that keeps the membrane film from being overstretched, weakened or compromised.

When the inner garment liner fabric is expanded the membrane film ruche effect lays out flat, allowing non-stretch membrane films to be used.

Knit a pure finish flat knit stretch garment lining fabric, creating a continuous adhesion surface. The outer surface can be brushed to create a fleece, etc., if desired.

2 Pre-fuse the adhesive to one side of the membrane film surface to create an adhesive membrane film composite, creating a continuous adhesive surface.

3 Pre-fuse an adhesive to the other side of the membrane film using a template or a die cut pattern of the adhesive to create an adhesive and membrane film composite, creating a dis-continuous adhesive surface.

Optionally, the adhesive can be fused to both sides of the membrane film surfaces, creating a continuous adhesive surface.

Optionally, the adhesive can be fused to the inside surface of the knit pure finish stretch garment lining fabric surfaces, creating a discontinuous membrane adhesion surface.

Optionally, the adhesive can also be fused to the inside surface of the outer shell fabric surface, creating a continuous membrane adhesion surface if the fabric is flat knit or woven.

Optionally, the surface between the adhesive and the membrane can be displaced by inserting a removable, i.e. Teflon® tube. The tubes can be of various sizes, shapes and quantities, dependent upon the stretch characteristics of the knit fabric to the membrane surface, creating a discontinuous membrane adhesion surface. The adhesive would only be in contact with the continuous adhesion fiber surface, allowing the membrane film to be free of additional adhesives that compromise breathability.

4 Sew and finish an outer shell garment pattern assembly.

5 Sew an inner garment liner pattern assembly to match the outer shell garment pattern assembly. The pattern seams of the inner garment liner pattern and the outer shell garment pattern do not have to match.

6 Manufacturer a 2D tender frame or clip frame platen in the shape of the assembled garment pattern assembly. The 2D frame platen width is adjustable to the stretch characteristics of the garment pattern assembly. The 2D frame platen can have clips to secure the garment pattern assembly.

7 Cut out the membrane film or the adhesive membrane film composite to the outline shape of the assembled garment pattern assembly. Leave a ±¼" sealing area available to allow the membrane film to be heat sealed to create the membrane films hydrostatic seal. The cut out membrane film or the membrane film adhesive outline shape can be adjusted to the area of the garment pattern assembly where the waterproof membrane film surface is required, for example, a shoulder section.

8 Turn the garment pattern assembly inside out so that the inner fabric surface is facing outwards.
   a Optional: Inner garment liner pattern assembly
   b Optional: Outer shell garment pattern assembly

9 Position the cut out membrane film or adhesive membrane film composite over and under the stretched out garment pattern assembly, adhesive to the fiber side.

Optionally, insert the removable tubes between the adhesive and the membrane surface.

10 Stretch out the garment pattern assembly onto the 2D frame platen exposing the inner fabric surface.

11 Fuse the cut out membrane film or adhesive membrane film composite with a 2D top and bottom heated platen to thermally set the adhesives.

Optionally, remove the removable tubes (if present) between the adhesive and the membrane surface creating the ruche pattern.

Time, pressure and temperature of the heated platen surface can be adjusted to the fabric thickness of the garment fabric and for the type of the garment fabric.

Vacuum of the heated platen surface to set the adhesives can be adjusted to the fabric thickness of the garment fabric and for the type of garment fabric.

12 Add ±¼" adhesive to the outside flattened surface of the sealed area of the membrane film adhesive composite.

Roll over the ±¼" sealing area above over the 2D outlined edges of the membrane film or membrane film adhesive composite of the garment pattern assembly.

Thermally heat set to seal the area to complete the hydrostatic sealing process.

13 Remove the prefabricated waterproof (WP) garment pattern assembly from the 2D frame platen.

14 Insert and sew in the prefabricated garment pattern assemblies to create the waterproof garment.

Optionally, if the adhesive is fused to both sides of the membrane film surfaces, then the adhesive can be thermally set to the inside surface of the other garment pattern assembly to create a 3-layer garment laminate structure.

Optionally, if the adhesive is fused to the inside surface of the garment pattern assembly surface then the adhesive can be thermally fused to the inside surface of the other garment pattern assembly to create a 3-layer garment laminate structure.

This can be accomplished through a 3D heating press, for example, a Veit Multiform Finisher VEIT 8363 Basic.

Optionally, selective adhesive pressing configuration is available.

Optionally, selective panel configuration is available, i.e. insulation panels, etc. can be positioned in between the membrane film surface and the interior surface of the inner lining fabrics.

Optionally, the knit pure finish stretch garment lining fabric rib pattern and flat knit pattern can be combined in various surface areas of the inner lining garment pattern assembly.

Optionally, the prefabricated WP inner liner garment pattern assembly can be left to hang as a garment drop liner.

Optionally, the prefabricated WP inner liner garment pattern assembly can be fully or partially fused to the inner surface of the outer shell garment pattern assembly.

Example 18

In one example of a fabrication process for ruche pattern, seam tape-less waterproof membrane sock (or glove) assembly:

1 Knit a pure finish double layer sock or two distinct socks creating a double sock combination—inner and outer prefabricated socks. Optionally, sew a sock pattern together to create a prefabricated sock. Various sock styles, such as i.e. mini crew, crew, etc. can be provided. The inner & outer socks can be knit with different fiber weights, different fibers and different rib patterns.

Knit a 1×1 rib pattern or various rib patterns in various areas of the socks. The outer ridge of the rib pattern is knit with a fiber that is thermally responsive to an adhesive and will not degrade or melt or at ±250° F., such as a polyester fiber, etc., creating a continuous adhesion surface Knit the inner rib ridge of the rib pattern with a fiber that is not thermally responsive to an adhesive and will not degrade or melt at ±250° F., such as PTFE, (for example, Teflon®) fiber, etc., creating a discontinuous adhesion surface.

2 Sew the prefabricated socks' toe seams; if it is a double layer sock then sew the outer sock toe seam only.

3 Pre-fuse the adhesive to the membrane film to one side to create an adhesive and membrane film composite, creating a continuous adhesion surface.

4 Pre-fuse an adhesive to the membrane film using a template or a die cut pattern of the adhesive to create an adhesive and membrane film composite, creating a discontinuous adhesive surface.

Optionally, the adhesive can be fused to both sides of the membrane film surfaces—creating a continuous adhesion surface.

Optionally, the adhesives can be fused to both sides of the knit pure finish inner socks surfaces, creating a continuous adhesion surface.

Optionally, the surface between the adhesive and the membrane can be displaced by inserting a removable tubes, for example, Teflon® tubes. The tubes can be of various sizes, shapes and quantities, dependent upon the stretch characteristics of the knit fabric to the membrane surface—creating a discontinuous adhesion surface.

When the prefabricated sock fabric is relaxed, the membrane film creates a ruche effect that keeps the membrane film from being overstretched, weakened or compromised. When the prefabricated sock fabric is expanded the membrane film ruche effect lays out flat, allowing non-stretch membrane films to be used.

5 Create a 2D platen in the shape of the prefabricated socks. The 2D sock platen width is adjusted to the stretch characteristics of the prefabricated socks.

6 Die-cut the adhesive and membrane composites or the adhesive and the membrane separately to the outline shape of the stretched outer prefabricated sock.

Leave a ±¼" sealing area available to allow the membrane to be fused to the membrane, creating the membrane film hydrostatic seal.

The die-cut membrane film and adhesive outline sock shape can be adjusted to the area of the outer sock that the waterproof surface is required, for example, a foot section.

7 Stretch out the outer prefabricated sock onto the 2D sock platen exposing the inner fabric surface.

8 Position the die-cut adhesive and membrane film composites or the separate adhesive and membrane film over and under the stretched out prefabricated sock, adhesive to the fiber side.

Optionally, insert the removable tubes between the adhesive and the membrane surface.

9 Fuse the die-cut adhesive and membrane film composite or the separate adhesive and membrane film with a 2D top and bottom heated platen to thermally set the responsive adhesive surface of the outer ridge of the rib pattern sock fibers.

Optionally, remove the removable tubes between the adhesive and the membrane surface creating the ruche as pictured below.

Time, pressure and temperature of the heated platen surface can be adjusted to the fabric thickness of the outer prefabricated sock and for the type of thermally responsive outer ridge of the rib pattern fiber of the outer prefabricated sock.

Vacuum of the heated platen surface to set the adhesives can be adjusted to the fabric thickness of the outer prefabricated sock and for the type of fibers used in the outer ridge of the rib pattern of the outer prefabricated sock.

10 Roll over the ±¼" adhesive side surface of the membrane film composite sealed seams over the 2D sock outlined edges to flatten and thermally heat set the seam surfaces to complete the hydrostatic sealing process.

11 Position an adhesive toe cap and position on top of the inner surface of the outer sock within the seam area.

Optionally position adhesive patches in between the two prefabricated socks to allow them to be heat set to create a bond between the two surfaces.

12 Sew the inner sock toe seam if it is a double layer sock.

13 Pull the inner prefabricated sock over the outer prefabricated, adhesive and membrane film composite sock.

14 Heat press the prefabricated socks together.

Optionally, if the prefabricated socks has adhesive patches, then heat press in those areas only.

Optionally, if the adhesive was pre-fused to both sides of the membrane film surface or to both sides of the inner socks surfaces then re-insert the tubes directly over the ruche membrane, heat press to permanently set the adhesives of the double layer socks together, then remove the tubes from between the membrane surface and the inner sock.

Optionally, if there are two separate socks, then the cuff is sewn together.

15 Remove the completed WP sock from the 2D sock platen.

The Ruche pattern garment construction provides a number of advantages.

The assembly process creates a uniform membrane film surface throughout the garment assembly. No seam tape is used or needed.

Seam tape can compromise the membrane barrier by increasing the amount of non-breathable surface area. For example, in an exemplary garment, approximately 10 linear yards of seam tape is used. Typical seam tape has widths of 10 mm or 22 mm.

For seam tape that is 10 mm wide, 10 linear yards provides an area of 141.732 $in^2$, or 0.029% of a 2.25 linear yard garment. For seam tape that is 22 mm wide, 10 linear yards provides an area of 319.011 $in^2$, or 0.065% of a 2.25 linear yard garment.

Seam tape costs $0.15 to $0.75 per 10 linear yards, or $1.50 to $7.50 per garment. This is the most expensive square footage of the garment assembly process. Eliminating seam tape eliminates this cost.

Seam tape is also disadvantageous because it creates a stiff stripe throughout the sewn seam taped surface areas. Additionally, the seams are the most critical construction part of the garment assembly. Most failures occur within the seam taped seams.

Seams also comprises the thermal insulation provided in a garment. A great deal of heat loss occurs through sewn seam surface area.

The ruching process described here allows for a greater surface of the membrane to be unencumbered with adhesives, increasing MVTR, etc.

The ruching tubes can be of various sizes, shapes and quantities, dependent upon the stretch characteristics of the knit fabric to the membrane surface and the increased MVTR required. This allows all membranes to have stretch characteristics (expansion and contraction) without degrading the membrane structure, for example, from repeat movement.

The continuous adhesion fiber surface provides the stretch that is required for fit.

The ruche of the membrane film lays out flat while the fabric is being stretched out to the maximum width. The assembly process creates a uniform insulation surface throughout the garment assembly Fabrication processes described herein are processes that creates a continuous barrier across a multi-layer fabric product that incorporates seams, such as a garment or a garment sub-assembly. The barrier can be a hydrostatic barrier that prevents or minimizes the infiltration of moisture. The barrier can alternatively or additionally be a thermal barrier that minimizes heat loss through the fabric product. While developed primarily for garments, the process can be used for other fabric products that incorporate seams.

Such fabrication processes employ a fusion process to create a laminated fabric composite in a fabric pattern panel (FPP) configuration in line with the construction of the fabric product. As described more fully below, the FPPs of each fabric layer are positioned and fused together, leaving an area around the perimeter unfused, which allows the barrier layer and any additional inner layers to be folded back to expose an outer shell. The outer shell FPPs are seamed together, for example, by sewing or ultrasonic welding, along the exposed edges to assemble the outer shell of the fabric product. The barrier layer is not compromised during the seaming of the outer shell, because the barrier layer is folded out of the way. Next, the barrier layer and any other layers are folded back over the outer shell such that the unfused edges overlap or interleave. All of the layers of the fabric product are then fused together to complete the lamination process and form the complete fabric product.

In one aspect, the process is used to fabricate a multi-layer fabric product including, as the barrier layer, a membrane barrier film that allows moisture vapor to escape outwardly through micro pores in the membrane barrier film but prevents liquid water from penetrating inwardly. The process provides complete surface coverage of the membrane barrier film across an inner surface including the seams of an outer shell fabric and an inner surface of an inner lining fabric. The seams in the outer shell fabric are thereby completely covered by the membrane barrier film, eliminating the need for seam tape.

The fabric pattern panels are fabricated in a manner that allows seams in an outer shell and an inner lining to be matched or offset, and allows the panel composite structures to be the same or different. The process sets the adhesive film structures in place, creating a uniform laminated membrane barrier film layer. The fusing presses provide a continuous pressure and thermal heat set of the adhesives in an even flow through the fabric pattern panel composites.

The process results in a fused laminate that is superior to current commercial multi-layered membrane barrier film laminated fabrics. The process can eliminate the lead time of purchasing outer shell fabrics pre-laminated with a membrane barrier film. It can eliminate the need to inventory multi-layered laminated membrane barrier film fabrics, as each outer shell fabric, membrane barrier film, adhesive compound and inner lining fabrics can be inventoried individually. It can eliminate the requirement for various fabric protective coatings, such as a separate application of a durable water repellency (DWR) coating on the surface of the shell fabrics after the commercial lamination process.

In one aspect, the process is used to fabricate a multi-layer fabric product including, as the barrier layer, an insulation layer or insulation package that provides a continuous thermal barrier across the fabric product and reduces heat loss through the seams of the outer shell. The process provides complete surface coverage of the insulation package across the inner surface of the outer shell fabric surface and the inner surface of the inner lining fabric. The insulated seams minimize thermal heat loss through the seam surface structures. This process allows the seams of the outer shell panel and the inner liner panel to be matched or offset. The fabric pattern panels are also designed to allow the panel composite structures to be the same or different.

The process allows for greater variation in choices of the outer shell fabrics, membrane barrier films, adhesive, insulation fibers, and inner linings, because the various materials can be individually selected and incorporated directly into the fabrication process at the factory. That is, it is not necessary to pre-order a pre-laminated fabric composite, such as an outer shell and membrane barrier, which requires determining an optimum quantity for the particular fabric product to be fabricated as well as resulting in seams that provide leakage pathways. Also, pre-ordering laminated fabric composites typically entails a wait of several weeks or even months for delivery.

The outer shell fabric(s) and inner lining fabric(s) can be selected for a specific style and color and in the quantity of yardage required for the fabric product being produced. The outer shell fabric can be any fabric, but preferably is mechanically strong, abrasion resistant, and may also be water repellent. The outer shell fabric can be, for example, a soft woven fabric, or any fabric woven or knit from one or more yarns of synthetic or natural material. Similarly, the inner lining fabrics can be, for example, a soft woven fabric, or any fabric woven or knit from one or more yarns of synthetic or natural material. Materials for the outer shell fabric and inner lining fabric can include, for example, polyesters, polyamides, polyvinylchlorides, polyketones, polysulfones, polycarbonates, fluoropolymers, polyacrylates, polyurethanes, co-polyetheresters, polypropylenes, and co-polyetheramides. The outer shell fabric and inner lining fabric can have any desired color and texture (e.g., it can have a camouflage pattern or it can be infrared or near-infrared absorptive or reflective), and can be dyed or impregnated as needed to achieve a desired appearance or functionality, such as water repellency (DWR). The outer shell fabric or inner lining fabric may contain Lycra® or another elastic fiber to create stretch characteristics. Lycra®, also known as spandex or elastane, is a polyurethane polyurea copolymer that can be woven into a fabric, such as an outer shell fabric, a liner fabric, or a seam tape fabric to provide elasticity. Alternatively, elasticity or stretch can be provided by using a woven or non-woven fabric having stretch in at least one direction. It is preferred that the outer shell fabric, lining fabric, and any seam tape fabric provide a similar or essentially identical degree of stretch, for optimum comfort and non-restrictive feel of the garment. A fleece fabric can be any fleece, such as a fleece made of PET, and can have any texture, color, or thickness as desired or as appropriate for a particular garment. The fleece is preferably insulating, breathable, and soft to the touch. Chemical substances such as flammability retarding agents can be also added.

The type and quantity of yardage of the membrane barrier films are selected as required for the fabric product being produced. The membrane barrier films, described in the processes herein can include a "hydrophobic polymer membrane" or "hydrostatic barrier membrane," which typically refers to a layer of synthetic or natural polymers that resists the passage of liquid water, in the form of droplets or microdroplets, across the membrane. Preferably, the hydrophobic polymer membrane allows the passage of water vapor, in the form of individual water molecules, so as to promote breathability of the laminated fabric. A hydrophobic polymer membrane can be prepared from a material such as microporous or nanoporous polytetrafluoroethylene (PTFE), expanded PTFE (ePTFE), polyurethane, cross-linked polyurethane, polypropylene, or polyester. One example of a waterproof laminated fabric is Gore-Tex® fabric (see, e.g., U.S. Pat. No. 3,953,566), which utilizes a porous PTFE membrane as the hydrophobic polymer membrane. The PTFE membrane of a Gore-Tex® fabric has a microstructure characterized by nodes interconnected by fibrils. The microporous or nanoporous nature of the PTFE membrane is such that water droplets are excluded from the pores, whereas water molecules can pass through the pores.

Another example of a membrane barrier film is the fabrics available from Cocona Technology, which incorporate activated carbon particles with microporous structures into the films. The membrane barrier films can include patterns printed on one side, for example, by a transfer printing process, which is particularly useful for lighter garments that do not also include a separate lining fabric. The membrane barrier film can also be printed with a coating, for example, to provide protection from abrasion.

The insulation is selected to provide the specific type and weight of a continuous or discontinuous filament insulation or equivalent and in the quantity required for the fabric product being produced. An insulating material can include a natural or synthetic material that provides thermal insulation. Insulating material can be made of synthetic lofted continuous filament insulation such as Climashield® Apex by HarVest Consumer Insulation, or Thinsulate™ microfibers by 3M. Insulating material is preferably lightweight and breathable, and can be made from fibers that can be hydrophobic or hydrophilic, fire retardant, flexible, and obtained from recycling or from a renewable fiber. One or more layers of fabric, such as a fleece or other non-containable fabric, or a tricot, can also be used as an insulating material.

A non-containable fabric refers to a fabric that does not allow saturation of the spaces between fibers of the fabric by an adhesive to create a hydrostatic seal. A non-containable fabric generally has a large volume of open space between microfibers of the fabric. Examples of a non-containable fabric include fleece and other insulating materials.

A fleece refers to a pile fabric, including woolen fabrics as well as synthetic fabrics. Fleece be made of or derived from natural fiber such as wool or a synthetic polymer, such as polyethylene terephthalate (PET) (e.g., Polarfleece® by Polartec, LLC). Fleece is typically lightweight, insulating, hydrophobic, and breathable, i.e., allowing water vapor to pass through. Pile fabrics are made by dying loose fibers, which are then mixed and combed into a long rope that is guided into a knitting machine, which permanently locks the fibers into a backing. The fabric is then sheared and finished. A pile results from the individual fibers standing on end. Fleece is made by first twisting fibers into a yarn, which is then knitted into a fabric. The fabric is then brushed, sheared, and finished.

The specific type and weight of the adhesive composite is selected for the type of fabric product being produced. The adhesive can be selected to withstand any laundering processes that the fabric product may undergo, such as washing, drying, dry cleaning, and ironing. The amount of adhesive can be increased or decreased as required by the type of outer shell fabric, membrane barrier film and inner lining fabric combination. The adhesives include powdered adhesives, web adhesives, micro-dot or nano-dot adhesives. Suitable adhesives can include polyurethane adhesives. Adhesives are typically measured in grams per square yard. The process can reduce a negative impact on the moisture vapor transmission rate (MVTR) over the membrane barrier film surface, by reducing the use of adhesives over the area of the membrane barrier film surface. The adhesives can be applied in a discontinuous pattern, such as in a dot, line, or grid pattern, or in no regular pattern, to minimize the amount of adhesive. Suitable adhesives are commercially available from various suppliers such as Bostik.

In another aspect, an individualized design application process is provided to create a garment that is specifically designed for a particular application. For example, a garment can be designed for a particular sport, such as skiing. A garment can be designed to address individual sizing problems, such as longer sleeve requirements. Individually-designed garments may have specific needs, such as a particular zipper placement, or specific performance panels. Specific performance panels can include, for example, a moisture barrier in selected areas of a garment, rather than throughout the entire garment. Similarly, insulation can be added in selected areas of a garment, or insulation of different weights can be located in different areas of the garment.

The process provides for the production of an individual garment with great versatility and little set-up time & lead time, while reducing costs that are associated with current custom manufacturing assembly processes. The outer shell fabrics are accessible in the separate garment make-up step, which allows the outer shell fabric pattern to be altered to accommodate varied panels of laminated & un-laminated fabrics. The variable inner and outer zone area panels can be the same size and shape to allow for invisible barrier seams to be aligned during the fusing process if desired. See US 2012/0282425. Seams can be either straight or curved, and the fabric pieces joined can have any shape or form as required for a particular garment piece. Two or more pieces of fabric can be joined to form a seam.

Figure 17:
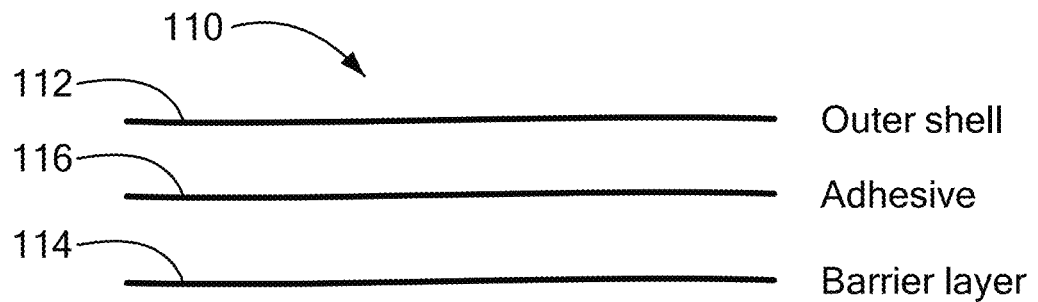
FIG. 17 is a schematic illustration of a multi-layer fabric product of the present invention.

Referring to FIG. 17, a multi-layer fabric product 110 is formed form at least an outer shell fabric 112 and a barrier layer 114. The outer shell fabric can be any suitable fabric, depending on fabric product, as described above. The barrier layer can be a moisture barrier or a thermal barrier, also as described above.

An adhesive layer 116 is interposed between the outer shell fabric and the barrier layer. The adhesive can be pre-applied on the barrier layer on the side adjacent the outer shell fabric. In other embodiments, an adhesive can be pre-applied to the opposite or interior-facing side of the barrier layer, for example, if additional layers are included in the fabric composite, as discussed further below. Exemplary adhesives include a web adhesive, a powder adhesive, a micro-dot adhesive, and a nano-dot adhesive. In one alternative, a web adhesive can be used as the barrier layer.

In an alternative, described further below, the barrier layer can be a multi-layer thermoplastic composite, thereby eliminating the requirement for additional adhesives or decreasing the amount of adhesives that are required.

The fabrication steps for a two-layer fabric product with matching seams are as follows:

1) Roll out the outer shell fabric 112, the barrier layer 114, and the interposed adhesive layer 116 onto a pattern cutting machine. Preferably, a pattern cutting machine that can cut multiple stacked layers of fabric is used, such as a Gerber pattern cutting machine. Cut out the fabric pattern panels (FPPs).

2) Remove the outer shell FPPs 118 and sew or ultrasonically weld any required findings, such as hoods, pockets, zippers, etc., into position. Position a moisture resistant adhesive seam tape where required, for example, along the zippers, using a thermal process.

Figure 18:
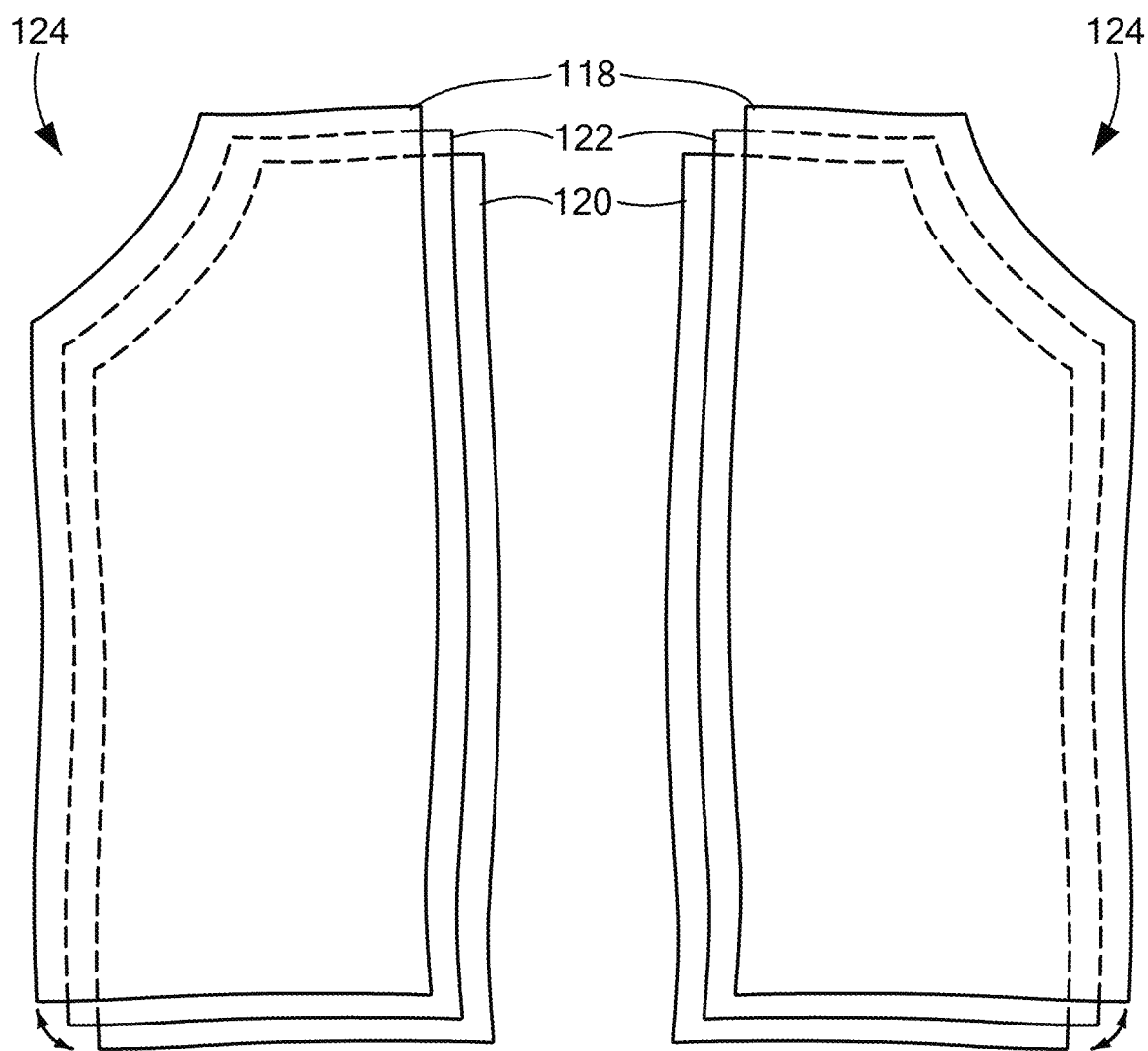
FIG. 18 is a schematic illustration of one embodiment of fabric pattern panels formed in the fabrication process of the present invention.

3) Align each of the partially finished outer shell FPPs 118 to its corresponding barrier layer FPP 120 and adhesive FPP 122, creating the full composite FPPs 124. See FIG. 18. FIG. 18 schematically illustrates two composite FPPs. It will be appreciated that the number of FPPs depends on the particular fabric product. For example, a jacket can have FPPs for front panels, back panels, side panels, and sleeves.

Figure 19:
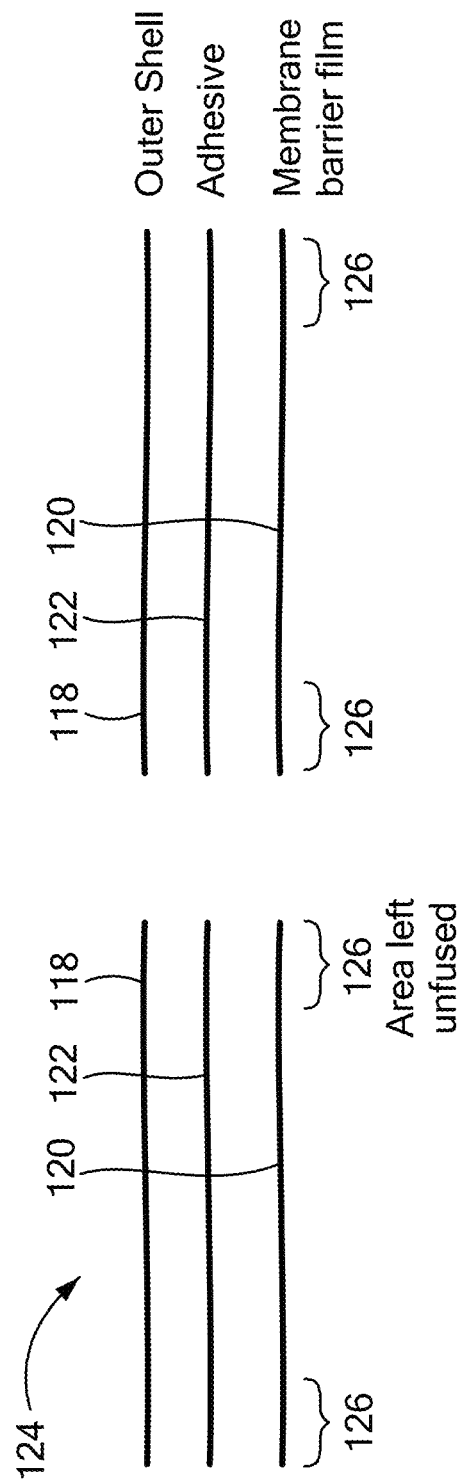
FIG. 19 is a schematic illustration of the fabric pattern panels of FIG. 18 at a further step in the fabrication process.

4) Fuse each of the full composite FPPs 124 together to create the fabric panel pattern alignment using either a soft set or a hard set. A soft set allows the barrier layer to be peeled back without damaging the surface structures. A hard set permanently sets the layers in place. An area 126 around the perimeter of the panel is left unfused, which allows the barrier layer FPP 120 and adhesive layer FPP 122 to be folded back without damaging the surface structures. The width of the area left unfused can be at least ½" in width or greater. In some embodiments, the width of the unfused area can be at least ⅝", ¾", 1 inch, 2, inches, 3 inches, or greater. See FIG. 19.

When fusing fabric layers with a soft set fuse, the press is set to a temperature of approximately 225° F. at zero pressure to allow the adhesive to flow to create an initial bond between the surfaces. This initial bond allows the individual layers to be pulled away from the other layers. When fusing fabric layers with a hard set fuse, the press is set to a temperature between 235° F. to 275° F. at 40 psi to 50 psi for 20 to 40 seconds. After pressing, the composite fabric is cooled under vacuum to set the adhesives into place and permanently laminate the fabric panels together.

Figure 20:
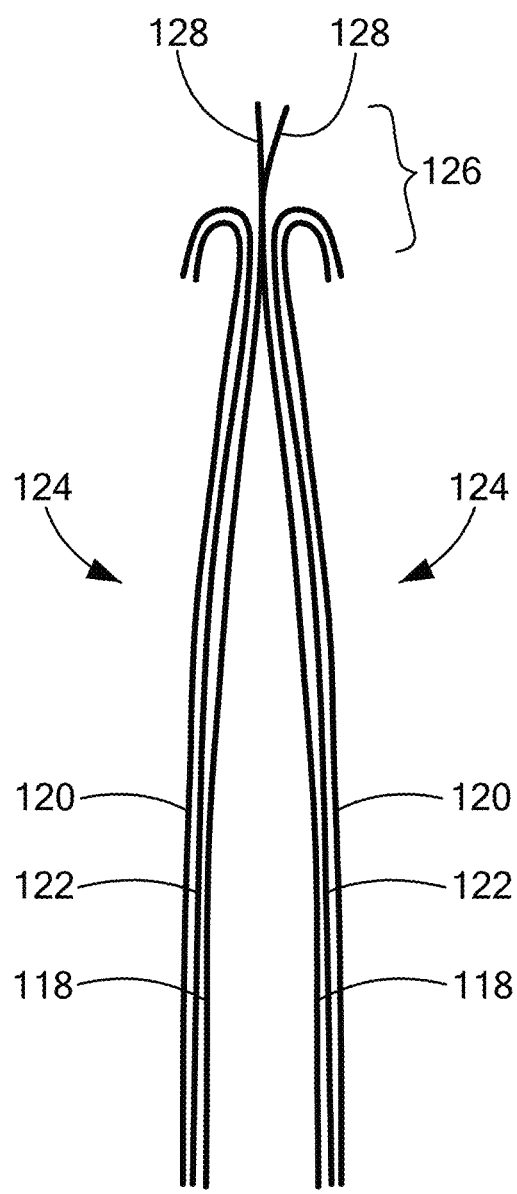
FIG. 20 is a schematic illustration of the fabric pattern panels of FIG. 19 at a further step in the fabrication process.

5) Fold back the barrier layer FPP 120 and the adhesive layer FPP 122 to expose the surface of the outer shell fabric 118. See FIG. 20.

6) Seam the outer shell fabric pattern panels together to provide a seam 128 along the exposed edges, for example, by sewing or ultrasonically welding, to assemble the outer shell of the fabric product. See FIG. 20. The barrier layer is not compromised, as it is held in position adjacent the outer shell by the adhesives and the edges of the barrier layer are folded over onto itself, out of the way of the seaming.

Figure 21:
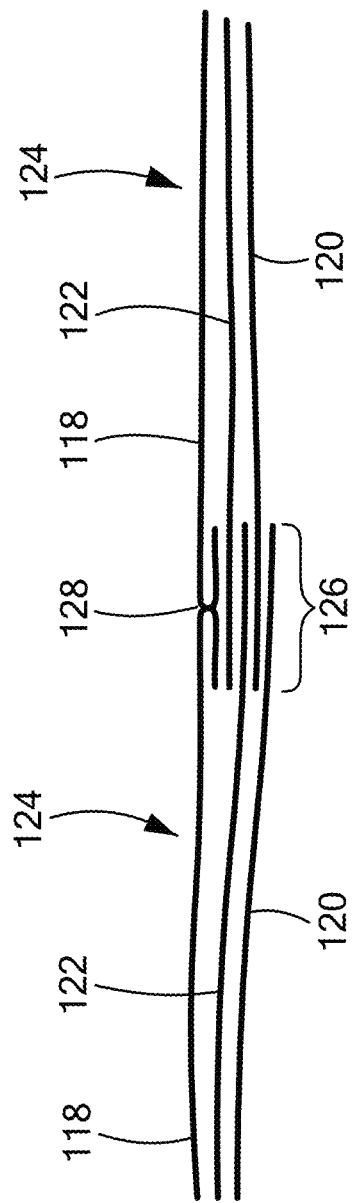
FIG. 21 is a schematic illustration of the fabric pattern panels of FIG. 20 at a further step in the fabrication process.

7) Fold the barrier layer and the adhesive layer (if present) back over the outer shell seam taped garment, so that the unfused areas 126 overlap. See FIG. 21.

8) Fuse the assembled layers together, including the unfused areas 126, to complete the lamination process and form the complete fabric product. This creates a uniform barrier layer throughout the complete fabric product. Moisture and thermal leakage pathways are eliminated and strengthened seams are provided in the finished fabric product.

The fusion process can employ a three-dimensional form finisher, such as a VEIT 8363 Basic Multiform finisher. A three-dimensional form finisher employs a dummy form over which a fabric product such as a garment is disposed. Heat and steam are introduced through the interior, applying pressure that inflates the garment outwardly and fuses all the layers together. Another example is the Dressman ironing robot from Siemens. To use such a finisher or robot, the garment is placed over the robot, which is then inflated to fit the garment from the inside, applying pressure. The robot is then filled with heated air or steam, which applies heat to the entire garment. Alternatively, a conventional steam ironing table could be used to carry out alignment lamination.

Figure 22:
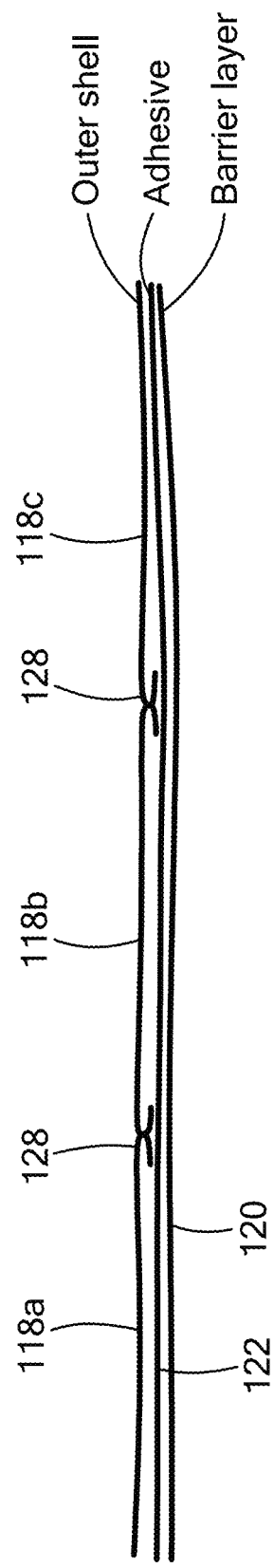
FIG. 22 is a schematic illustration of a further embodiment of a multi-layer fabric product.

In another aspect, the seams in the outer shell do not need to align with seams in the barrier layer. See FIG. 22. For example, sides 118A, 118C and back 118B of the outer shell of a garment such as a jacket can be cut out as separate FPPs and seamed together to create a single large panel that can lay flat. The barrier layer FPP 120 and adhesive layer FPP 122 can be cut out as a single large panel that matches the perimeter of the seamed single large panel of the outer shell. In this case, the outer shell fabric is rolled out and cut separately from the barrier layer and adhesive layer. Then the barrier layer and adhesive layer are positioned on the inner surface of the outer shell FPP and fused, leaving the edges around the perimeter unfused, as described above. Because this assembly can lay flat, a two-dimensional pressing machine, such as VEIT BRI-2001 E/101 pressing machine, can be used. The barrier layer fully covers the seams 28 in the outer shell, leading to a continuous, uniform barrier across the outer shell.

Figure 23:
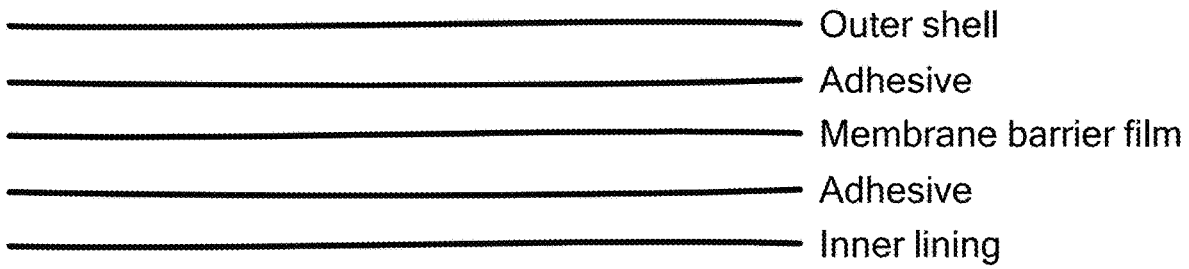
FIG. 23 is a schematic illustration of a further multi-layer fabric product.
Figure 24:
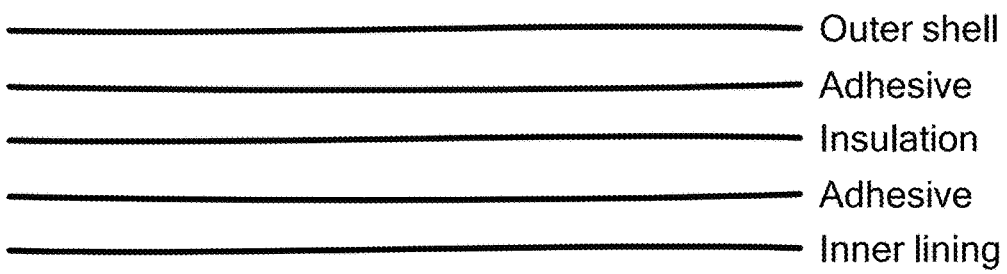
FIG. 24 is a schematic illustration of a still further multi-layer fabric product.
Figure 25:
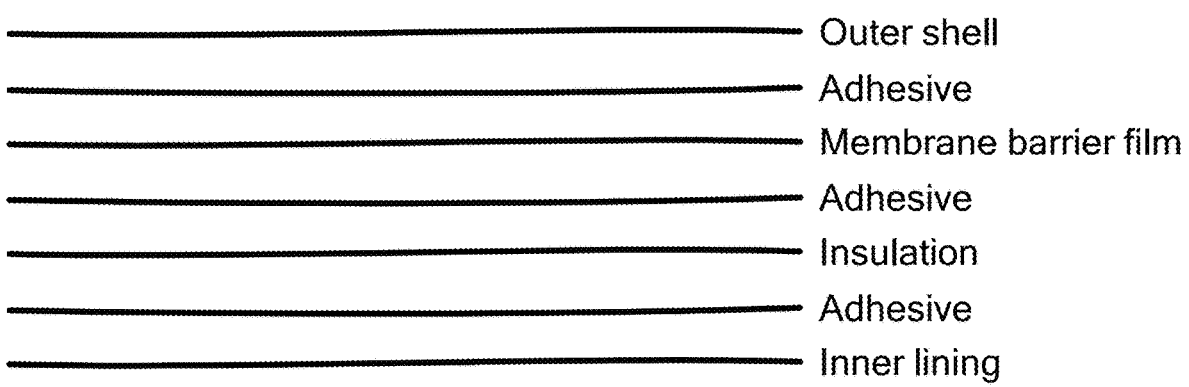
FIG. 25 is a schematic illustration of a still further multi-layer fabric product.

Many fabric products incorporate three or more layers. For example, in one embodiment, a multi-layer fabric composite is formed from multiple layers including an outer shell fabric, an inner lining fabric, and as the barrier layer, a membrane barrier film as a moisture barrier between the outer shell fabric and the inner lining fabric. See FIG. 23. The inner lining fabric can be an insulating fabric, such as a fleece, or an un-insulating fabric, such as a tricot. Alternatively, the barrier layer can be an insulation package of a continuous or discontinuous filament insulation or equivalent. See FIG. 24. In a further alternative, in addition to a membrane barrier film, an insulation package can be provided adjacent an interior side of the inner lining fabric. See FIG. 25. A suitable adhesive layer can be interposed between each of the layers as needed.

The fabrication steps for a three-layer or four-layer fabric composite with matching seams and employing as the barrier layer a membrane film and, optionally, an insulation package in addition to the membrane film, are as follows:

1) Roll out the outer shell fabric, membrane film, and any adhesive layers, the insulation package (if present), and the inner lining fabric onto a pattern cutting machine, such as a Gerber pattern cutting machine or equivalent, and cut out the garment fabric pattern panels (FPPs).

2A) Remove the outer shell FPPs and sew or ultrasonically weld any required findings, such as hoods, pockets, zippers, etc., into position, and position an adhesive seam tape film where required through a thermal process.

2B) Remove the inner lining FPPs and sew or ultrasonically weld any required findings, such as zippers, pockets, etc. into position.

3) Align the partially finished outer shell and partially finished inner shell FPPs to the matching membrane film FPP, and the insulation package (if present), creating the full composite FPPs. Position the adhesive layer(s) on the appropriate side of the membrane barrier film (if not already laminated to the membrane barrier film).

4) Fuse the full composite FPPs together to create the fabric panel pattern alignment using either a soft set or a hard set leaving an area around the perimeter of the panel unfused, as described above.

5) Fold back the membrane film, the adhesive layer or layers, the insulation package (if present), and the inner lining fabric at the unfused areas to expose the outer shell fabric surface.

6) Seam the outer shell fabric pattern panels together along the exposed edges, for example, by sewing or ultrasonically welding, to assemble the outer shell of the fabric product. The membrane barrier film (and insulation package if present) is not compromised, as it is held in position adjacent the outer shell by the adhesives and the edges of the membrane barrier film are folded over onto itself, out of the way of the seaming. It is not necessary to attach an adhesive seam tape to the seam at this step (although it could be done if desired; see US 2012/0282425).

Figure 26:
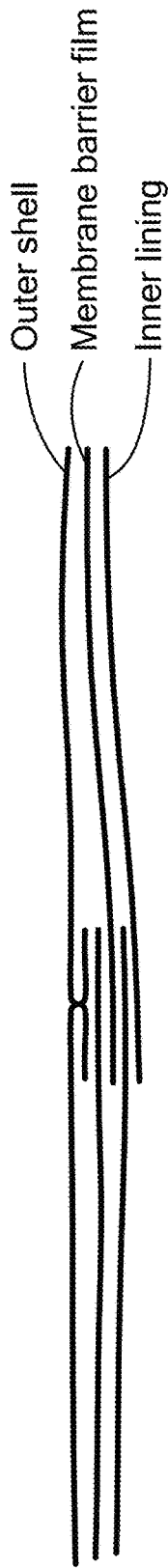
FIG. 26 is a schematic cross-sectional illustration of a multi-layer fabric product.
Figure 27:
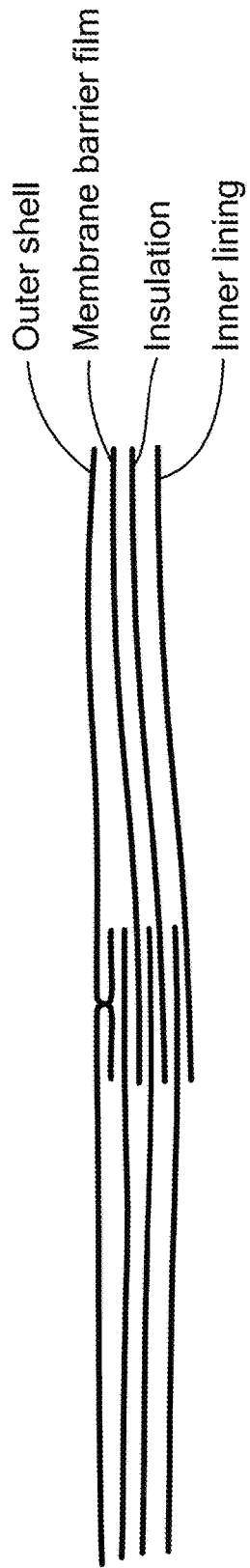
FIG. 27 is a schematic cross-sectional illustration of a further multi-layer fabric product.

7) Fold the membrane barrier film, the adhesive layer(s), the insulation package (if present), and the inner lining fabric back over the outer shell seam taped garment, so that the seam allowances overlap. See FIG. 26 or 27 (in which the adhesive layers have been omitted for clarity).

8) Seam the inner lining FPP composite together along the seam surface, for example, by sewing or ultrasonic welding. The unfused area of the inner lining FPP can be pulled away from the other layers as needed to form the seam.

9) Fuse the assembled garment, product or sub assembly product to complete the lamination process, as described above. The lamination process can be accomplished by applying a heat and/or pressure source over a large area of the assembled garment, or over the entire garment at once. This final step of alignment lamination creates a strong laminate bond between the fabrics of the garment. This creates a uniform membrane barrier film layer throughout the complete garment assembly, eliminating leakage pathways through the moisture barrier and providing strengthened seams in the garment, product, or sub-assembly product.

It will be appreciated that a three-layer fabric product incorporating only an insulation layer can be fabricated as described above for a three-layer product incorporating only a membrane barrier film. Similarly, additional layers can be included and can be handled in the same manner as the barrier layer or insulation package described above.

In a variant of the fabrication process for a multi-layer fabric composite with matching seams, the steps are as follows, in which steps 1-4 are as described above:

5) Fold back the composites of the inner lining fabric and adjacent layer(s) of adhesive to expose the outer shell fabric, the membrane film, and the interposed adhesive layer (if present).

6) Seam the outer shell fabric, the adhesive layer (if present) and the membrane barrier film together to create the outer shell garment. While the membrane film surface is exposed, position an adhesive seam tape film where required through a thermal process.

7) Fold the inner lining fabric back over the outer shell garment.

8) Seam the inner liner fabric panel together along the seam surface, for example, by sewing or ultrasonic welding.

9) Fuse the assembled garment, product or sub assembly product to complete the lamination process, as described above.

For a fabric product in which the seams between the outer shell fabric and one or more of the other layers are offset, rather than matched, the following steps are followed:

1A) Roll out the outer shell fabric onto a pattern cutting machine, such as a Gerber pattern cutting machine or equivalent, and cut out the offset outer shell fabric composite of the garment fabric pattern panel.

1B) Roll out the adhesive layer (if present), the membrane film, further adhesive layer (if present), the insulation package (if present), and the inner lining fabric composites onto a pattern cutting machine, such as a Gerber pattern cutting machine or equivalent, and cut out the offset composites of the garment fabric pattern panels.

2A) Remove the outer shell fabric pattern panels and sew or ultrasonically weld the required findings, i.e. hoods, pockets, zippers, etc. into position.

2B) Remove the inner lining fabric pattern panels and sew or ultrasonically weld the required findings, i.e. zippers, pockets, etc. into position.

3) Align the partially finished outer shell and partially finished inner shell fabric pattern panels, the membrane film, the adhesive layer(s), and the insulating package (if present), creating the full offset fabric pattern panel composites.

4) Fuse the full composite fabric pattern panels together to create the fabric panel pattern alignment using either a soft set or a hard set, leaving an area around the perimeter unfused, as described above.

5) Fold back the membrane film, the adhesive layer(s), the insulation package (if present), and the inner lining fabric at the unfused areas to expose the outer shell fabric surface.

6) Seam the outer shell fabric pattern panels together, for example, by sewing or ultrasonic welding, to assemble the outer shell garment, product, or sub-assembly product.

7) Fold membrane film, the adhesive layer(s), the insulation package (if present), and the inner lining fabric back over the outer shell garment.

8) Seam the inner liner fabric panel composite together along the seam surface, for example, by sewing or ultrasonic welding.

9) Fuse the assembled garment, product or sub assembly product to complete the lamination process, as described above.

In a variant of the fabrication process for a multi-layer fabric composite with offset seams, the steps are as follows, in which steps 1-4 are as described above:

5) Fold back the composites of the inner lining fabric and adjacent layer of adhesive (if present) to expose the outer shell fabric, the membrane film, and the interposed adhesive layer (if present).

6) Sew or ultrasonically weld the outer shell fabric, the adhesive layer (if present), and the membrane film together to create the outer shell garment. While the membrane film surface is exposed, position an adhesive seam tape through a thermal process.

7) Fold over the inner lining fabric and the adjacent adhesive layer (if present) back over the outer shell garment, product, or sub-assembly product.

8) Seam the inner liner fabric pattern panel together along the seam surface, for example, by sewing or ultrasonic welding.

9) Fuse the assembled garment, product or sub assembly product to complete the lamination process, as described above.

Some garments include one or two quilted insulation packages. For example, a quilted insulation package can be the outside of the garment, the inside of the garment, or on both the outside and inside of the garment. The quilting can provide a desirable aesthetic appearance in addition to incorporating thermal insulation into the garment. However, the stitching used to quilt the layers of the insulation package also causes small perforations through which heat loss occurs. Thus, an additional continuous thermal barrier can be provided to reduce this heat loss through the quilted stitches.

Figure 28:
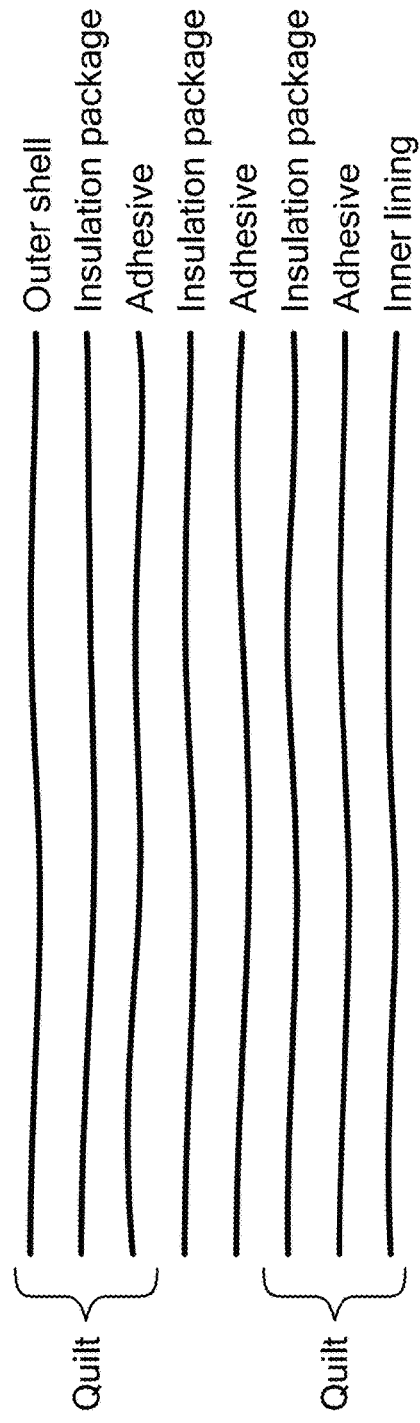
FIG. 28 is a schematic illustration of a still further multi-layer fabric product.

Referring to FIG. 28, one example of a quilted garment is fabricated from layers including an outer shell fabric, an outer shell insulation package, an lining inner insulation package, an inner lining fabric, and an intermediate barrier layer insulation package. The insulation packages can be formed from a continuous or discontinuous filament insulation or equivalent. Separate adhesive layers can be interposed between the outer insulation package and the intermediate insulation package and between the inner insulation package and the intermediate insulation package. The adhesive layers can be a micro-dot adhesive, a powder adhesive or a web adhesive. The adhesive layers can be pre-applied to the insulation packages.

The fabrication steps for a quilted fabric product are as follows:

1A) Quilt together the outer shell fabric, outer shell insulation package, and adhesive layer (if present) in a desired quilting pattern or motif to create an outer quilted composite. Similarly, quilt together the inner lining fabric, the inner lining insulation package, and adhesive layer (if present) in a desired quilting pattern or motif to create an inner quilted composite. If necessary, fuse an adhesive layer to one or both sides of the intermediate barrier layer insulation package.

1B) Roll out the outer quilted composite, the barrier layer insulation package, and the inner quilted composite above onto a pattern cutting machine, and cut out the fabric pattern panels.

2A) Remove the outer quilted fabric pattern panel composites and sew or ultrasonically weld the required findings, i.e. hoods, pockets, zippers, etc. to complete the assembly.

2B) Remove the inner quilted fabric pattern panel composites and sew or ultrasonically weld the required findings, i.e. zippers, pockets, etc. into position.

3) Align each of the partially finished outer quilted composites and the inner quilted fabric composites to the corresponding barrier layer insulation packages, creating the full FPP composites.

4) Fuse the full FPP composites together to create the fabric panel pattern alignment using either a soft set or a hard set, as described above.

5) Fold back the barrier layer insulation packages and the inner quilted composites to expose the interior side of the outer quilted composite.

6) Sew or ultrasonically weld the outer quilted composite FPPs together to assemble the outer shell of the fabric product.

7) Fold the barrier layer insulation package and the inner quilted composites back over of the outer quilted composite the seam allowances overlap.

8) Sew or ultrasonically weld the inner quilted composites together along the seam surface.

9) Fuse the assembled layers together to complete the lamination process. This creates a uniform insulation layer of a continuous or discontinuous filament insulation or equivalent throughout the complete fabric product, eliminating thermal heat loss through the outer shell seams and quilting stitches and a thermal heat gain next to the body.

Garment Assembly Example 19

As an example, the above fabrication steps can be used in the fabrication of a garment such as a waterproof/breathable (WP/BR) jacket having an outer shell, a membrane film barrier layer, and inner lining, as follows:
1 Roll out the outer shell fabric, the adhesive layer (if the adhesive has not been pre-applied), the membrane film, the adhesive (if the adhesive has not been pre-applied), and the inner lining fabric composite onto a pattern cutting machine and cut out the garment fabric pattern panels. Optionally, the inner lining fabric pattern does not have to be matched to the outer shell fabric pattern.
2 Remove the outer shell fabric, the adhesive, the membrane film, and the adhesive pattern panels and sew or ultrasonically weld and seam tape the back, sides and front panels of the garment assembly; add any required findings, i.e. zippers, pockets, etc. into position to pre-finish the outer shell garment assembly.
3 Take the inner lining fabric pattern panels and sew or ultrasonically weld the garment assembly as necessary.
4 Optionally sew in and seam tape a zipper and a collar assembly.
5 Position the inner lining fabric pattern panel garment assembly on top of the fabric pattern panel two-layer laminate garment assembly to form a fabric pattern panel garment pattern assembly.
6 Fuse the fabric pattern panel garment pattern assembly together with a hard set, leaving an unfused area around the perimeter to allow the insertion of the zipper, collar, sleeve areas and the hem line.
7 For each sleeve, lay out the sleeve fabric pattern panels, which are the outer shell laminate and inner lining.
8 Position the inner lining fabric pattern panel sleeve on top of the outer shell laminate fabric pattern panel sleeve and membrane barrier film to form a fabric pattern panel sleeve pattern assembly.
9 Hard set flat press leaving an unfused area around the perimeter to allow the insertion and finishing of the sleeve assemblies.
10 Sew and seam tape the FPP sleeve assemblies to the FPP garment pattern assembly.
11 Sew and seam tape the zipper and collar assembly (if not performed in the garment assembly step above).
12 Ultrasonically weld or sew the open flaps of the inner lining fabric seams to complete the sleeve and shoulder seam surfaces.
13 Hard set press the non-pressed open flap seam surfaces to complete the pressing of the FPP garment pattern assembly.

Garment Assembly Example 20

As another example, the above fabrication steps can be used in the fabrication of a garment such as an insulated, WP/BR jacket having an outer shell, a membrane film barrier layer, an insulation package, and an inner lining, as follows:
1 Roll out the outer shell fabric, the web adhesive (if the adhesive is not pre-applied), the membrane film, the adhesive (if the adhesive is not pre-applied), and the inner lining fabric composite onto a pattern cutting machine, and cut out the garment fabric pattern panels. Optionally, the inner lining fabric pattern panel does not have to be matched to the outer shell fabric pattern panel.
2 Roll out the insulation package and the optional adhesive and cut out in a single piece construction matching the sewn inner lining fabric pattern panel assembly.
3 Remove the outer shell, web adhesive (if present), membrane film, and web adhesive (if present) fabric pattern panels and sew or ultrasonically weld and seam tape the back, sides and front panels of the garment assembly. Add any desired findings, i.e. zippers, pockets, hood, etc., into position to pre-finish the outer shell garment assembly.
4 Take the inner lining fabric pattern panel and sew or ultrasonically weld the inner lining garment assembly. Optionally sew in and seam tape the zipper and the collar assembly.
5 Position the inner lining fabric pattern panel garment composite assembly on top of the prefabricated outer shell fabric pattern panel assembly, the FPP garment pattern assembly.
6 Hard set flat press the FPP garment pattern assembly leaving an unfused area around the perimeter to allow the insertion of the zipper, collar and sleeve areas.
7 For each sleeve, lay out the sleeve fabric pattern panels, which are the outer shell laminate, insulation, and inner lining.
8 Position the insulation and the inner lining sleeve fabric pattern panels on top of the outer shell laminate fabric pattern panel sleeve, forming an FPP sleeve pattern assembly.

9 Hard set flat press leaving an unfused area around the perimeter to allow the insertion and finishing of the sleeve assemblies.
10 Sew and seam tape the FPP sleeve pattern assemblies to the FPP garment pattern assembly.
11 Sew and seam tape the zipper and collar assembly (if not performed in the garment assembly procedure above).
12 Fold over and position the insulation layer over the seam taped seam surface.
13 Ultrasonically weld or sew the open flaps of the inner lining fabric seams to complete the sleeve and shoulder seam surfaces.
14 Hard set press the non-pressed open flap seam surfaces to complete the pressing of the FPP garment pattern assembly.

Garment Assembly Example 21

The process as above in Example 20 can be used with a multi-layer composite formed of individual parts, where seam tape would not be required in the sleeve and the shoulder seams:
Steps 1 through 6 are the same as above in Example 20.
7 For each sleeve, lay out and cut out the outer shell fabric, web adhesive, membrane film, web adhesive, optional insulation, optional web adhesive, and inner lining fabric pattern panels.
8 Position the inner lining fabric pattern panel sleeve assemblies, the optional web adhesives, the optional insulation on top of the outer shell laminate fabric pattern panel sleeve assembly to form each FPP sleeve assembly.
9 Hard set flat press leaving an unfused area around the perimeter to allow the insertion and finishing of the sleeve assemblies.
10 Sew the outer shell fabric pattern panel sleeve to the FPP garment pattern assembly.
11 Sew and seam tape the zipper and collar assembly (if not performed in the garment assembly procedure above).
12 Fold over and position the web adhesive, membrane film, web adhesive, insulation fiber layer, web adhesive over the sewn outer shell fabric seam surface.
13 Ultrasonically weld or sew the open flaps of the inner lining fabric seams to complete the sleeve and shoulder seam surfaces.
14 Hard set press the non-pressed open flap seam surfaces to complete the pressing of the FPP garment pattern assembly.

A variety of fabric products can be fabricated by the process of the present invention. Such fabric products include garments or articles of clothing, such as insert liners, bootie insert liners, glove insert liners, jackets, coats, parkas, raincoats, cloaks, ponchos, shirts, blouses, pants, shoes, boots, gloves, hats, hoods, or other headwear, or underwear such as undershirts, briefs, bras, socks, and diapers. Fabric products can also include protective suits for handling of hazardous materials, including chemicals, biological materials, and radioactive materials, or in protective suits for firefighters, military personnel, and medical personnel. Other fabric products include blankets, towels, sheets, pet bedding, tents, sleeping bags, tarps, boat covers, carpeting, rugs, mats, window coverings, and upholstery, and any fabric-based structure or device that serves to entrap, store, or transport water or an aqueous liquid, such as bags, hoses, or bladders, or where thermal insulation is needed.

Machines for performing cut/weld seaming operations using ultrasound are known and commercially available. For example, the firm Jentschmann, AG (Huntwangen, Switzerland) provides a variety of suitable machines. The ultrasound energy applied during seaming can be adjusted according to the needs of the particular seam, including the characteristics of the fabrics and the adhesive. Welding conditions depend on conditions of temperature and humidity and the type of fabric, hydrostatic barrier membrane, and fleece. Ultrasonic machines are available which simply weld fabrics together as well as those which cut fabrics in addition to welding them. Adjusting an ultrasonic fabric welding machine according to such conditions is well within the capabilities of the ordinary skilled person. It is understood that an ultrasonic welding or cutting and welding machine can be used to carry out methods of the invention in different modes. In addition to ultrasound, other sources of energy that can be used to perform a seam welding operation include heat energy, laser energy, and other forms of electromagnetic radiation (e.g., microwave or radio frequency).

Several known methods are available for testing the hydrostatic resistance properties of a fabric product fabricated according to the present invention. These include ASTM Standard D 5385, 1993(2014)E1, "Standard Test Method for Hydrostatic Pressure Resistance of Waterproofing Membranes," ASTM International, West Conshohocken, Pa., DOI: 10.1520/D5385_D5385M-93R14E01. In one example, a fabric product according to the invention has a hydrostatic resistance of at least 1, 2, 3, 4, or 5 psi for 3 minutes using ASTM D 5385. In another example, a fabric product according to the invention has a hydrostatic resistance of at least 3 psi for 3 minutes using ASTM D 5385. In some embodiments, a fabric product according to the invention has a hydrostatic resistance of at least 1, 2, 3, 4, 5, 10, 15, 20, 25, 30, 35, 40, 45, or 50 psi.

Hydrostatic resistance can also be tested in accordance the Hydrostatic Resistance test method described in ASTM D751, 2006(2011) "Standard Test Methods for Coated Fabrics," ASTM International, West Conshohocken, Pa., DOI: 10.1520/D0751-06R11. In some embodiments, a fabric product according to the invention has a hydrostatic resistance of at least 1, 2, 3, 4, 5, 10, 15, 20, 25, 30, 35, 40, 45, or 50 psi.

The fabric product can also be tested by a test method to evaluate the barrier effectiveness against liquids. Such test methods include ASTM F903, 2010, "Standard Test Method for Resistance of Materials Us in Protective Clothing to Penetration by Liquids," ASTM International, West Conshohocken, Pa., DOI: 10.1520/F0903-10. The fabric product can be tested as a barrier against various compounds, such as foams (for example, aqueous fire fighting foams), hydraulic fluids, battery acid (which includes sulfuric acid, for example, 37%), pool chlorine, and fuels (for example, Fuel C).

As another example, the fabric product can be tested to see if it passes a test for resistance to synthetic blood as determined by ASTM F1670, 2008(2014)E1, "Standard Test Method for Resistance of Materials Used in Protective Clothing to Penetration by Synthetic Blood," ASTM International, West Conshohocken, Pa., DOI: 10.1520/F1670_F1670M-08R14E01. A further test is to determine if the fabric product passes a test for resistance to pathogenic micro-organisms, including blood borne pathogens as determined by ASTM F1671, 2013, "Standard Test Method for Resistance of Materials Used in Protective Clothing to Penetration by Blood-Borne Pathogens Using Phi-X174 Bacteriophage Penetration as a Test System," ASTM International, West Conshohocken, Pa., DOI: 10.1520/F1671_F1671M.

A variety of adhesives are commercially available and can be used as the adhesive layer(s) described above. As noted above, an adhesive, such as a web adhesive, a powder adhesive, or a micro-dot adhesive, can be pre-applied on one or both sides of the membrane barrier film or the insulation package. In one alternative, a web adhesive can become the membrane barrier film. Generally, the least amount of adhesive necessary should be used to avoid blocking the micro pores of the barrier membrane film and reduce the moisture vapor transport rate (MVTR). A powder adhesive is best suited to have the least impact on the MVTR of the membrane barrier film. Micro dot adhesives typically decrease the MVTR of the membrane barrier film the greatest amount.

In one trial, the MVTR of a laminate employing a stretch fabric, a membrane barrier film, and a fleece lining, employing several adhesives from Bostik was measured and compared to the MVTR of the membrane barrier film alone. The following results were obtained:

| Sample | Adhesive | MVTR ($g/m^2$/24 hours) | Percent reduction in MVTR |
|---|---|---|---|
| A | Bostik powder | 536 | 20% |
| B | PE103 15 G web adhesive | 498 | 26% |
| C | PE103 25 G web adhesive | 482 | 28% |

In a further alternative, the membrane barrier film can be a multi-layer thermoplastic composite, thereby eliminating the requirement for additional adhesives or decreasing the amount of adhesives that are required.

In another aspect of the present invention, a low melt membrane film can be provided on one or both sides of a high melt membrane film, for use as a moisture barrier in a garment, to enhance the subsequent adhesion of the membrane barrier film to another layer by a chemical and thermal mechanical bond. The low melt film melts at lower temperatures, providing adhesion at reduced temperatures. This can be useful, for example, for temporary adhesion during a garment fabrication process or for tacking one substrate to another prior to forming a more permanent attachment between the substrates. Also, the presence of the low melt membrane film allows for a reduction in the amount of additional adhesives, such as micro-dot, powdered, or web adhesives, that would otherwise be needed, which can reduce the cost of the membrane film. For example, the melting temperature of the high melt membrane film can be, for example, 5, 10, 15, 20, 30, 40, or 50° C. or more higher than the melting temperature of the low melt membrane film.

In some garments that employ a moisture barrier layer, the barrier layer is provided by a breathable thermoplastic polyurethane (TPU) membrane film as the primary barrier layer. Usually, the TPU membrane film has a high melt temperature rating. A low melt TPU membrane film can be added on one or both sides of the high melt TPU membrane film as one or more outer layers to enhance the chemical and thermal mechanical bond surfaces. For example, a low melt TPU membrane film can subsequently react as an adhesive in other portions of the garment fabrication process, such as when an invisible barrier seam is formed, as described US 2012/0282425. The low melt TPU membrane film can react with the adhesive used in these subsequent fabrication steps, creating a higher quality adhesion bond. Because of the adhesion qualities of the low melt TPU membrane films, operator error can be reduced, and the upper and lower heat and pressure bounds during the pressing sequences of the fabrication process can be expanded.

Additionally, it will be appreciated that TPU membrane films can have different melt temperatures. Thus, a TPU membrane film having a first low melt temperature can be provided on one side of a substrate, and a further TPU membrane film having a different, lower, melt temperature can be provided on the opposite side of the substrate. For example, the two low melt films can have different degrees of cross-linking.

The low melt membrane film can be formed from a variety of suitable materials, such as a polyester, polyether, polypropylene or a polyurethane material. The film can be breathable or non-breathable.

The high melt membrane film can also be formed from a variety of suitable materials, such as a polyester, polyether, polypropylene, polyurethane, expanded polytetrafluoroethylene (ePTFE) or a polytetrafluoroethylene material. The high melt film can be breathable or non-breathable. The high melt membrane film can be a single pass, single ply high melt membrane film as described in Example 3.

In a fabrication process, the low melt membrane film(s) and high melt membrane film can be fed from spools onto a conveyor belt and introduced into a suitable heated lamination machine. Alternatively, one or more of the films can be provided from suitable extrusion dies. Additionally, during the fabrication process, chemical additives can be compounded with one or more of the membrane films in a liquid or plastic form (for example, through an extrusion die) or applied from hoppers, nozzles, or other dispensers onto the films in substrate form. In a further alternative, the low melt membrane film can be die cut into smaller pieces or an open pattern to reduce the surface area of the high melt membrane film that is covered by the low melt membrane film.

In one example, a multi-layer TPU/ePTFE membrane layout includes a high melt ePTFE breathable barrier membrane film, and a low melt TPU breathable membrane film on one or both surfaces. The TPU films on the outer surfaces can be selected to have different melt temperatures, i.e., a low melt TPU and a lower melt TPU.

The composite membrane film as described herein can be used as a moisture barrier in fabric products such as garments. Various woven, non-woven, or knit outer shell fabrics can be selected and fused to the membrane barrier film outer surface. Similarly, various woven or knit inner lining fabrics can be selected and fused to the membrane barrier film inner surface. The composite membrane film can be fed directly to the fabric, or the composite membrane film can be stored, for example, rolled on a spool, for subsequent use. Completion of the lamination process occurs during the remainder of the garment manufacturing process.

In some cases, one of the films can be a single ply membrane film after a single pass through an extruder that may not be commercially viable due to the presence of pin holes. Laminating the single pass film to the other layers effectively fills the pinholes. By providing more usable material, waste is eliminated and cost reductions can be realized in fabrication processes for various fabric products that employ membrane films.

It will be appreciated that the various features of the embodiments described herein can be combined in a variety of ways. For example, a feature described in conjunction with one embodiment may be included in another embodiment even if not explicitly described in conjunction with that embodiment.

The present invention has been described in conjunction with certain preferred embodiments. It is to be understood that the invention is not limited to the exact details of construction, operation, exact materials or embodiments shown and described, and that various modifications, substitutions of equivalents, alterations to the compositions, and other changes to the embodiments disclosed herein will be apparent to one of skill in the art.

What is claimed is:

1. A process for use in fabricating a multi-layered fabric product comprising:
    (a) providing first fabric panels, a barrier layer and an adhesive interposed between the first fabric panels and the barrier layer, the first fabric panels and the barrier layer provided as separate panels, the barrier layer comprising one of a moisture barrier and an insulation barrier, the panel of the barrier layer having a configuration corresponding to at least two of the first fabric panels seamed together;
    (b) seaming the at least two first fabric panels together along a seam to form a flat fabric assembly;
    (c) aligning the barrier layer fabric panel to the flat fabric assembly to extend across the seam to form a composite fabric panel; and
    (d) fusing the composite fabric panel together, leaving an area about a perimeter of the composite fabric panel unfused;
    (e) seaming the flat fabric assembly to a further fabric panel; and
    (f) fusing the composite fabric panels to form a fabric product assembly having a continuous barrier extending across a surface of the fabric product assembly.

2. The process of claim 1, wherein the barrier layer comprises a membrane barrier film.

3. The process of claim 2, wherein the membrane barrier film comprises a hydrophobic polymer membrane.

4. The process of claim 2, wherein the membrane barrier film comprises a micro porous structure that allows transport of water vapor across the membrane barrier film while preventing or minimizing transport of liquid water across the membrane barrier film.

5. The process of claim 2, wherein the membrane barrier film comprises a microporous polytetrafluoroethylene, a nanoporous polytetrafluoroethylene, an expanded PTFE, a polyurethane, a cross-linked polyurethane, a polypropylene, or a polyester.

6. The process of claim 2, wherein the membrane barrier film is equally resistant to at least one of pathogenic microorganisms, blood borne pathogens, viruses, bacteria, liquid chemical agents, and gaseous chemical agents across the inner surface of first fabric panels and the seam.

7. The process of claim 1, wherein the barrier layer comprises an insulation material comprising a natural or synthetic filament material.

8. The process of claim 1, wherein the adhesive comprises a powder adhesive, a web adhesive, a micro dot adhesive, a nano dot adhesive.

9. The process of claim 1, wherein the first fabric panels comprise an outer shell fabric comprising a polyester, a polyamide, a polyvinylchloride, a polyketone, a polysulfone, a polycarbonate, a fluoropolymer, a polyacrylate, a polyurethanes, a co-polyetherester, a polypropylene, and a co-polyetheramide.

10. The process of claim 1, wherein the first fabric panels comprise an outer shell fabric comprising multiple layers quilted together.

11. The process of claim 1, wherein the first fabric panels comprise an inner lining fabric.

12. The process of claim 11, wherein the inner lining fabric comprises a fleece material or a tricot material.

13. The process of claim 11, wherein the inner lining fabric comprises a polyester, a polyamide, a polyvinylchloride, a polyketone, a polysulfone, a polycarbonate, a fluoropolymer, a polyacrylate, a polyurethane, a co-polyetherester, a polypropylene, or a co-polyetheramide, or a combination thereof.

14. The process of claim 1, wherein step (b) further comprises sewing or ultrasonically welding the first fabric panels together.

15. The process of claim 1, wherein step (d) further comprises fusing the composite fabric panel together with a soft set that allows the layers to be adjusted or a hard set that does not allow the layers to be adjusted.

16. The process of claim 1, wherein step (f) includes fusing the composite fabric panels together on a three-dimensional pressing machine or a two-dimensional pressing machine.

17. The process of claim 1, wherein in step (e), the further fabric panel includes a further barrier layer, and step (f) includes folding one or more unfused areas of the barrier layer and further barrier layer over at least one further seam.

18. A fabric product made by the process of claim 1.

19. The fabric product of claim 18, wherein the fabric product comprises an article of clothing, a portion of an article of clothing, a jacket, a coat, a parka, a raincoat, a cloak, a poncho, a shirt, a blouse, pants, shoes, boots, gloves, a hat, a hood, underwear, an undershirt, briefs, a bra, socks, a diaper, a protective suit for handling of hazardous materials, a protective suit for a firefighter, military personnel, or medical personnel, a blanket, a towel, a sheet, pet bedding, a tent, a sleeping bag, a tarp, a boat cover, carpeting, a rug, a mat, a window covering, and upholstery.

\* \* \* \* \*